(12) United States Patent
Arefi

(10) Patent No.: US 12,460,556 B2
(45) Date of Patent: *Nov. 4, 2025

(54) THERMAL PROCESSES AND SYSTEMS FOR GENERATING ELECTRICITY UTILIZING PREDETERMINED WORKING FLUIDS

(71) Applicant: Babak Bob Arefi, Spring, TX (US)

(72) Inventor: Babak Bob Arefi, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,787

(22) Filed: Feb. 7, 2024

(65) Prior Publication Data
US 2024/0368996 A1     Nov. 7, 2024

Related U.S. Application Data

(62) Division of application No. 18/682,064, filed as application No. PCT/US2022/040240 on Aug. 12, (Continued)

(51) Int. Cl.
*F01D 15/10*     (2006.01)
*F03G 4/00*      (2006.01)
(Continued)

(52) U.S. Cl.
CPC ............. *F01D 15/10* (2013.01); *F03G 4/001* (2021.08); *F03G 4/031* (2021.08); *F03G 4/035* (2021.08);
(Continued)

(58) Field of Classification Search
CPC .......... F01D 15/10; F03G 4/001; F03G 4/031; F03G 4/035; F24T 10/20; F24T 50/00; H02K 7/1823
See application file for complete search history.

(56) References Cited

U.S. PATENT DOCUMENTS 6,668,554 B1 * 12/2003 Brown ................ E21B 41/0064
                                                60/641.2
7,695,636 B2 *  4/2010 Fukushima ............ C09K 5/045
                                                252/73
(Continued)

OTHER PUBLICATIONS

International Preliminary Report of Patentability (Chapter II of PCT App No. PCT/US2022/040240) Oct. 31, 2023.

(Continued)

*Primary Examiner* — Hoang M Nguyen
(74) *Attorney, Agent, or Firm* — McCutcheon Joseph, PLLC

(57) ABSTRACT

A process of generating electricity from a thermal energy source includes selecting a predetermined primary fluid having: a latent heat greater than a latent heat of water at a phase change from liquid to gas; and a specific heat capacity less than a specific heat capacity of water in a liquid phase and in a gas phase; and selecting a predetermined secondary fluid having: a latent heat less than a latent heat of water at a phase change from liquid, to gas; and; a specific heat capacity less than a specific heat capacity of water in a liquid phase and in a gas phase. The process includes the primary fluid absorbing thermal energy from the thermal energy source; exchanging the thermal energy of the primary fluid with the secondary fluid; driving a turbine via the secondary fluid; and driving an electricity generator by the turbine to generate electricity.

12 Claims, 21 Drawing Sheets

Related U.S. Application Data 2022, application No. 18/435,787 is a division of application No. PCT/US2022/040240, filed on Aug. 12, 2022.

(60) Provisional application No. 63/292,186, filed on Dec. 21, 2021, provisional application No. 63/232,351, filed on Aug. 12, 2021.

(51) Int. Cl.
*F24T 10/20* (2018.01)
*F24T 50/00* (2018.01)
*H02K 7/18* (2006.01)

(52) U.S. Cl.
CPC ............. *F03G 4/037* (2021.08); *F24T 10/20* (2018.05); *F24T 50/00* (2018.05); *H02K 7/1823* (2013.01)

(56) References Cited

U.S. PATENT DOCUMENTS

| | | | | |
|---|---|---|---|---|
| 8,464,511 | B1* | 6/2013 | Ribarov | H02K 7/14 60/268 |
| 10,598,160 | B2* | 3/2020 | Sumrall | F24T 10/17 |
| 2008/0190106 | A1* | 8/2008 | Mak | F01K 25/06 60/531 |
| 2010/0126178 | A1* | 5/2010 | Hyde | F02K 3/025 60/645 |
| 2015/0240715 | A1* | 8/2015 | Dhanuka | F02C 3/34 60/39.182 |
| 2018/0224164 | A1 | 8/2018 | Lakic | |
| 2020/0131943 | A1* | 4/2020 | Kontomaris | F01K 25/08 |
| 2020/0300231 | A1 | 9/2020 | Zhou et al. | |

OTHER PUBLICATIONS

"A Study of Latent Heat of Vaporization in Aqueous Nanofluids" Thesis, Arizona State University by Lee, Soochan; Aug. 2015 (https://keep-dev.lib.asu.edu/items/153948/view).

* cited by examiner

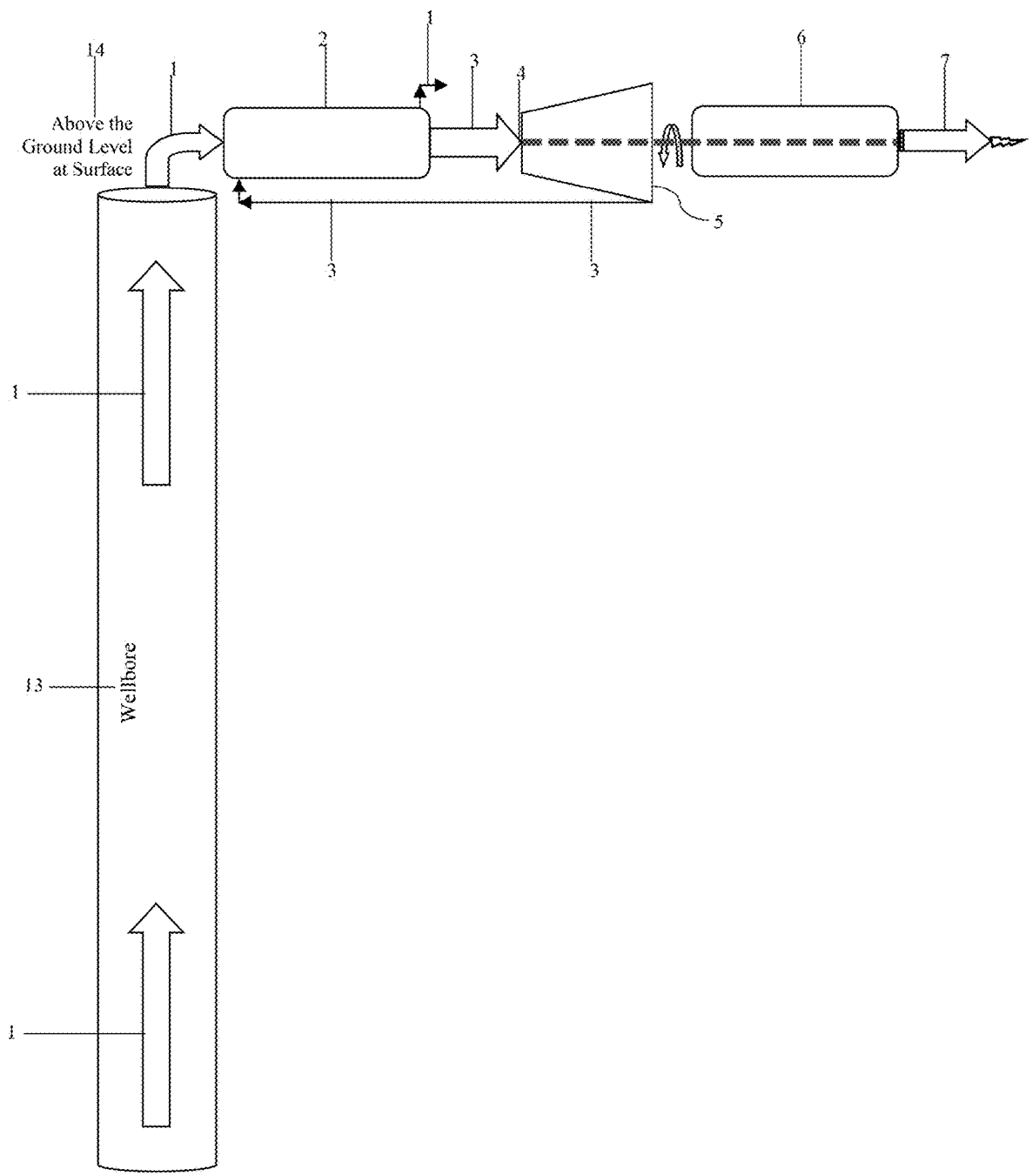

Figure 4D
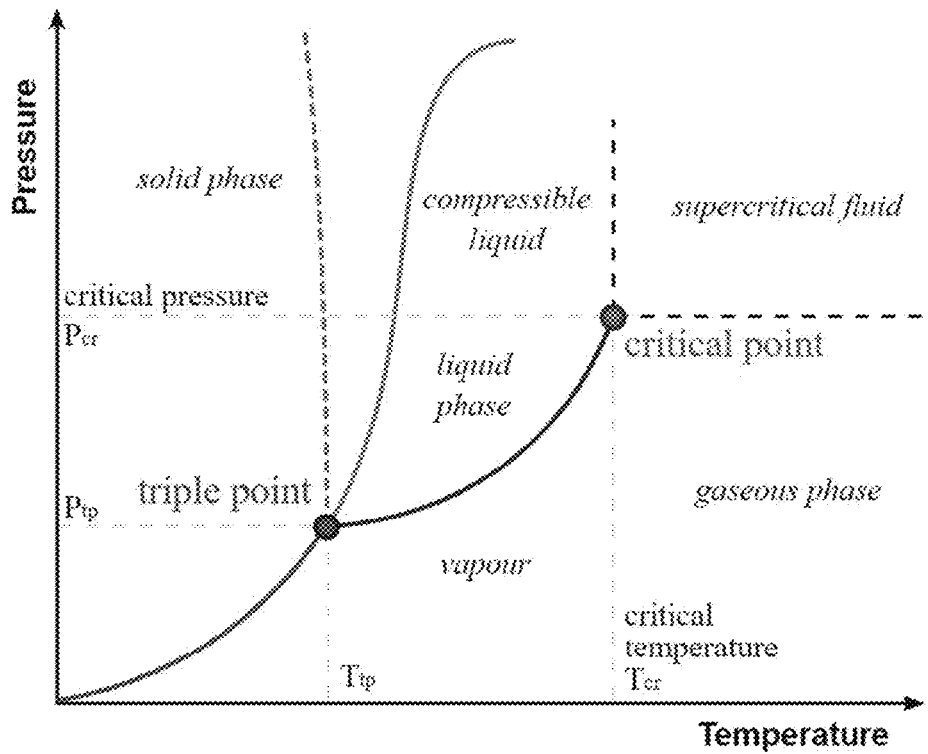
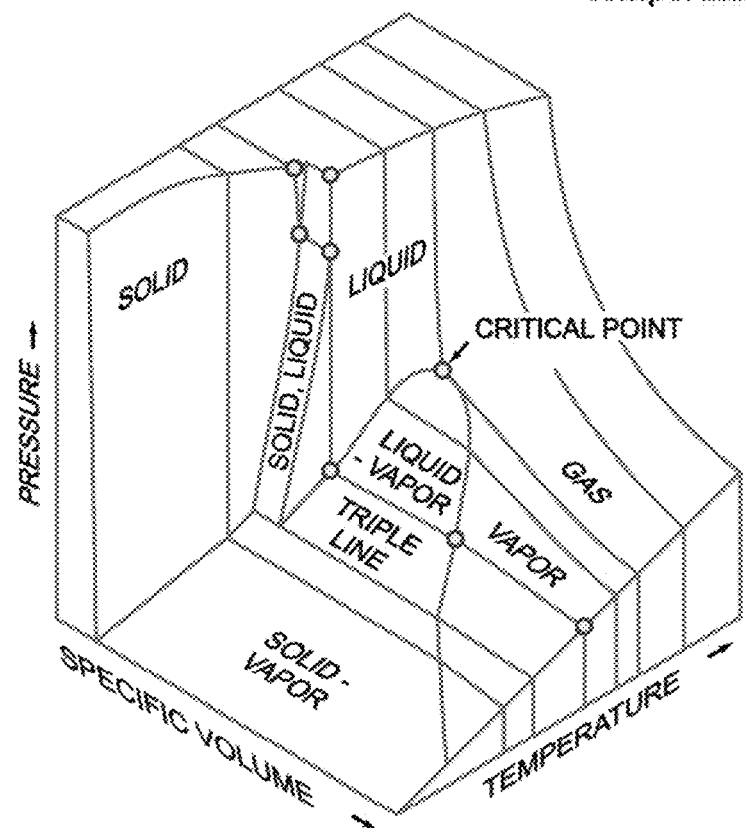

Figure 5

| Importance | Criteria | 1st Fluid | 2nd Fluid | 3rd Fluid | ... | nth Fluid |
|---|---|---|---|---|---|---|
| Critical | Boiling Point | Value 1 | Value 2 | Value 3 | ... | Value n |
| Medium | Flash Point | Value 1 | Value 2 | Value 3 | ... | Value n |
| Critical | Specific Heat Capacity | Value 1 | Value 2 | Value 3 | ... | Value n |
| Medium | Specific Heat Storage Capacity | Value 1 | Value 2 | Value 3 | ... | Value n |
| Critical | Latent Energy | Value 1 | Value 2 | Value 3 | ... | Value n |
| Low | Thermal Conductivity | Value 1 | Value 2 | Value 3 | ... | Value n |
| High | Phase Status | Value 1 | Value 2 | Value 3 | ... | Value n |
| High | Specific Enthalpy | Value 1 | Value 2 | Value 3 | ... | Value n |
| High | Specific Entropy | Value 1 | Value 2 | Value 3 | ... | Value n |
| High | Supercriticality | Value 1 | Value 2 | Value 3 | ... | Value n |
| | ⋮ | ⋮ | ⋮ | ⋮ | ⋮ | ⋮ |
| Critical | Cost | Value 1 | Value 2 | Value 3 | ... | Value n |
| Medium | Corrosiveness | Value 1 | Value 2 | Value 3 | ... | Value n |
| Medium | Erosiveness | Value 1 | Value 2 | Value 3 | ... | Value n |
| Critical | Flammable | Value 1 | Value 2 | Value 3 | ... | Value n |
| High | Harmfulness | Value 1 | Value 2 | Value 3 | ... | Value n |
| High | Environmentally Friendly | Value 1 | Value 2 | Value 3 | ... | Value n |
| | Sum: | Value 1 | Value 2 | Value 3 | ... | Value n |
| | Rank: | 2nd | nth | 1st | ... | 3rd |
| | Selection Status: | 2nd Choice | nth Choice | 1st Choice | ... | 3rd Choice |

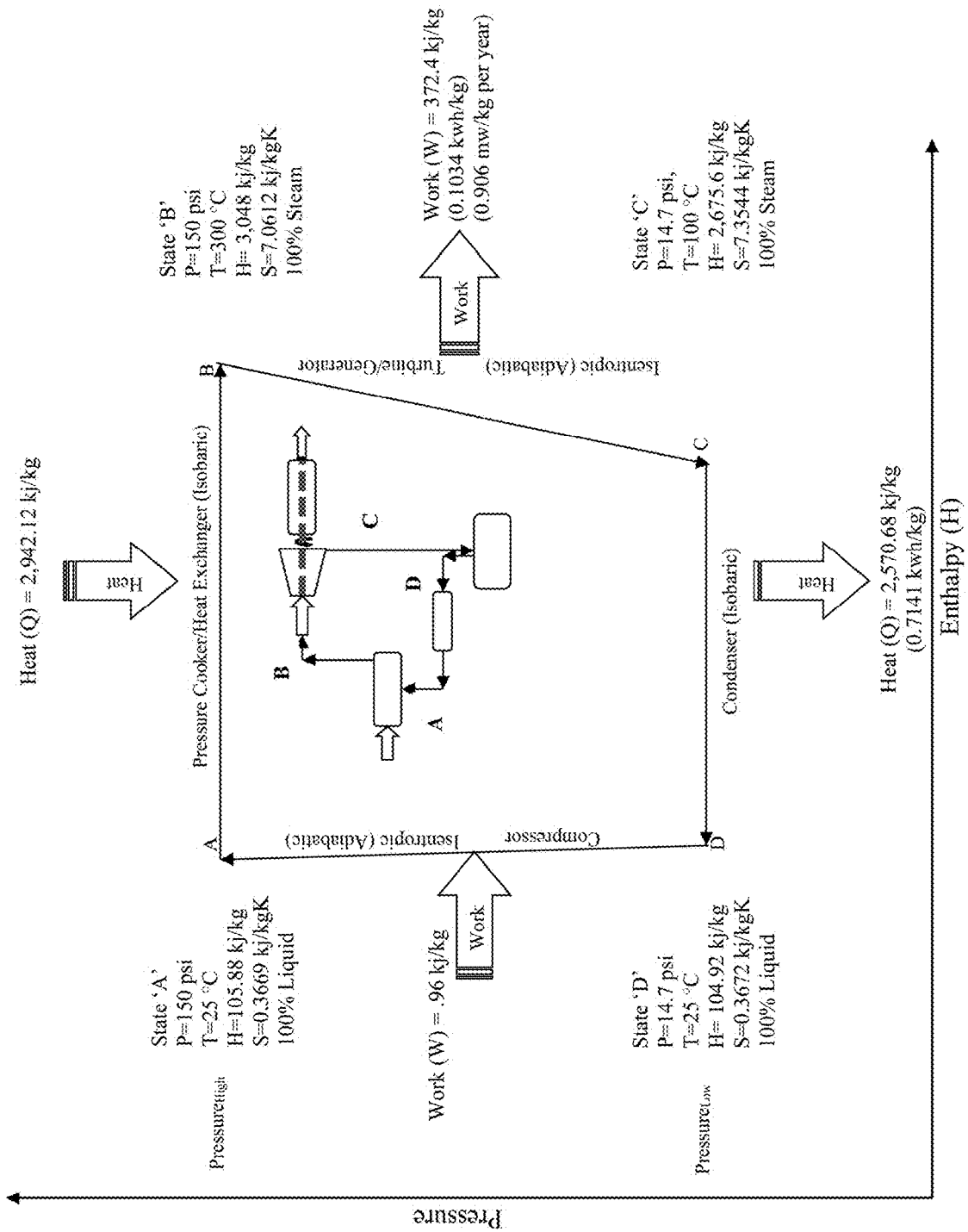

THERMAL PROCESSES AND SYSTEMS FOR GENERATING ELECTRICITY UTILIZING PREDETERMINED WORKING FLUIDS

CROSS REFERENCE TO RELATED APPLICATIONS

This application is a divisional patent application claiming priority to and the benefit of a Patent Cooperation Treaty (PCT) International Patent Application No. PCT/US2022/040240, titled "Thermal Processes and Systems for Generating Electricity Utilizing Predetermined Working Fluids," filed on Aug. 12, 2022, and a U.S. National Stage Patent Application Ser. No. 18/682,064, titled "Thermal Processes and Systems for Generating Electricity Utilizing Predetermined Working Fluids," filed on Feb. 7, 2024. The International Patent Application No. PCT/US2022/040240 claims priority to and the benefit of U.S. Provisional Application No. 63/232,351, filed on Aug. 12, 2021, and to U.S. Provisional Application No. 63/292,186, filed on Dec. 21, 2021. The U.S. National Stage Patent application Ser. No. 18/682,064 claims priority to and the benefit of the International Patent Application No. PCT/US2022/040240. The disclosures of the prior applications are hereby incorporated by reference herein in their entireties.

TECHNICAL FIELD

The present disclosure relates to green energy generation processes and systems, such as thermal, geothermal, solar, and kinetic energy processes and systems, which generate electricity. In particular, the present disclosure relates to thermal energy systems and processes utilizing predetermined working fluids that are selected based on properties which minimize heat loss of the working fluids and maximize the absorption of thermal energy that is converted to kinetic energy and mechanical energy for driving an electricity generator to generate electricity.

BACKGROUND

Known green energy systems include geothermal energy systems that utilize a naturally occurring energy source to generate electricity. Geothermal energy systems extract heat from an underground geologic formation, such as a hot rock reservoir. In a typical geothermal energy system, water is pumped down into an underground rock formation to transfer thermal energy of the rock formation to the surface. At the surface, the heated water, in the form of steam for example, is utilized in a process that drives a turbine and an electrical generator to produce electrical power. The water may then be pumped back into the underground formation to repeat the cycle.

SUMMARY

In known geothermal energy systems, water is used as the working fluid to absorb thermal energy of the underground rock formation. However, the physical and/or chemical properties of water may prevent it from being a good candidate as a working fluid in a geothermal energy system. For instance, the latent heat of water at a phase change from liquid to gas may be smaller than the latent heat of other potential fluids at a phase change from liquid to gas. Further, the specific heat capacity of water in the liquid and gas phases may be greater than other potential fluids in the liquid and gas phases. As a result, the temperature water can obtain may not be as great as the temperature those other fluids can obtain. Accordingly, water may not be an efficient working fluid for minimizing heat loss and maximizing the absorption of thermal energy as other fluids that may be selected for utilization as a working fluid in geothermal energy systems. The loss of heat and thermal energy reduces the kinetic energy of a working fluid, and hence the potency in which the fluid can drive the turbine of a geothermal energy system. Driving the turbine with less energy decrease the amount of electromagnetic induction in the electricity generator that is driven by the turbine, and as a result the amount of electricity produced by the electricity generator decreases. Moreover, an analytical, value assigned process for determining or creating a suitable working fluid other than water, that is based on fluid properties/characteristics, economic, and environmental factors, has not heretofore been implemented.

Geothermal wells have been the primary source of thermal energy for generating electricity. For many years, wells have been drilled deep into the earth to reach underground temperatures high enough to heat water to the level where its kinetic energy is able to do work, to ultimately generate electricity. Most geothermal wells have been drilled where high thermal energy was closer to the surface, such as near the Pacific Ocean, where such high downhole temperatures can be reached at a shallower depth. Drilling deep wells can be time consuming and costly, and maintaining deep wells for geothermal processes can be expensive.

The present disclosure describes thermal energy systems and processes that implement predetermined working fluids selected to minimize heat loss and maximize the absorption of thermal energy in the systems and processes. Minimizing heat loss and maximizing the absorption of thermal energy increases the kinetic energy of the working fluids, and hence the potency in which the working fluids can drive the turbine or other mechanical device of a thermal energy system. Driving the turbine or other mechanical device with more energy increases the amount of electromagnetic induction in the electricity generator that is driven by the turbine, and as a result the amount of electricity produced by the electricity generator increases. The present disclosure further describes an analytical, value assigned process for selecting, determining and/or creating a suitable working fluid(s) that is based on fluid properties/characteristics and environmental factors.

Moreover, the thermal systems and processes for generating electricity discussed herein are not limited having to thermal energy sources in deep geothermal wells. The disclosed the thermal systems and processes can utilize thermal energy from nearly any thermal source-such as gas flares resulting from the burning process of natural gas associated with oil extraction; exhaust flue gas; exhaust emitted from an engine; heat conducted from oil and gas pipelines/flow lines; combustion occurring in an engine or a gas turbine; and commercial and residential heaters, such as water heaters, furnaces, ovens and stoves—to produce work to effectively and efficiently generate electricity via an electricity generator. These thermal energy sources are in addition to solar energy sources and geothermal energy sources, such as wells and reservoirs in underground geologic formations. By proper selection or design of a working fluid (e.g., other than water) to suit the specificity type of thermal energy source, thermodynamic conditions of cycle, and/or environmental aspects, sufficient thermal energy can be absorbed from any of these thermal energy sources and utilized to effectively and efficiently perform work that is used to drive an electricity generator to generate electricity.

The selected or designed fluid may be suited to the specific type of thermal energy source, such that the fluid and its ability to absorb the requisite amount of thermal energy is not dependent on only thermal energy sources in deep underground wells.

The present disclosure thus provides systems and processes for generating electricity from a thermal energy source that are improvements over known systems and processes.

In one embodiment, a geothermal system for generating electricity comprises: a predetermined primary fluid that absorbs thermal energy from a geothermal energy source to become a heated primary fluid; a predetermined secondary working fluid; a heat exchanger in which the predetermined secondary working fluid absorbs the thermal energy from the heated primary fluid to elevate a kinetic energy of the predetermined secondary working fluid; a turbine that is driven by the kinetic energy of the predetermined secondary working fluid; and an electricity generator that is driven by the turbine to generate electricity, wherein the predetermined primary fluid comprises: a latent heat greater than a latent heat of water at a phase change from liquid to gas; and a specific heat capacity less than a specific heat capacity of water in a liquid phase and in a gas phase; and the predetermined secondary working fluid comprises: a latent heat less than a latent heat of water at a phase change from liquid to gas; and a specific heat capacity less than a specific heat capacity of water in a liquid phase and in a gas phase.

In an embodiment, the predetermined secondary working fluid is in a supercritical state when the kinetic energy drives the turbine.

In an embodiment, at least one of the predetermined primary fluid and the predetermined secondary working fluid is utilized in the system based on a sum total of values assigned to physical and chemical properties of the at least one of the predetermined primary fluid and the predetermined secondary working fluid, the physical and chemical properties including at least one of: boiling point, specific heat capacity, latent energy, phase status, specific enthalpy, specific entropy, supercriticality, flash point, specific heat storage capacity, and thermal conductivity.

In an embodiment, the values assigned to the boiling point, the specific heat capacity, and the latent energy have greater weight than the values assigned to the phase status, the specific enthalpy, the specific entropy, the supercriticality, the flash point, the specific heat storage capacity, and the thermal conductivity, the values assigned to the phase status, the specific enthalpy, the specific entropy, the supercriticality have greater weight than the values assigned to the flash point, the specific heat storage capacity, and the thermal conductivity, and the values assigned to the flash point and the specific heat storage capacity have greater weight than the value assigned to the thermal conductivity.

In an embodiment, at least one of the predetermined primary fluid and the predetermined secondary working fluid is utilized in the system based on a sum total of values assigned to Health, Safety and Environmental (HSE) properties of the at least one of the predetermined primary fluid and the predetermined secondary working fluid, the Health, Safety and Environmental (HSE) properties including at least one of: flammability, harmfulness to humans, environmental friendliness, corrosiveness, and erosiveness.

In an embodiment, the value assigned to the flammability has a greater weight than the values assigned to the harmfulness to humans, the environmental friendliness, the corrosiveness, and the erosiveness, and the values assigned to the harmfulness to humans and the environmental friendliness have a greater weight than the values assigned to the corrosiveness and the erosiveness.

In an embodiment, at least one of the predetermined primary fluid and the predetermined secondary working fluid is utilized in the system based at least in part on a value assigned to a monetary cost of the at least one of the predetermined primary fluid and the predetermined secondary working fluid.

In an embodiment, a boiling point of the predetermined primary fluid is lower than a temperature of the geothermal energy source, and the predetermined secondary working fluid has a lower boiling point than a temperature of the predetermined primary fluid at the heat exchanger.

In an embodiment, the predetermined primary fluid is comprised of one or more materials that provide the predetermined primary fluid with a latent heat that is at least greater than total heat loss from the geothermal energy source to maintain at least a boiling temperature of the predetermined primary fluid at the heat exchanger.

In another embodiment, a geothermal system for generating electricity comprises: a predetermined working fluid that absorbs thermal energy from a geothermal energy source to become a heated working fluid; a turbine that is driven by kinetic energy of the heated working fluid; and an electricity generator that is driven by the turbine to generate electricity, wherein the predetermined working fluid comprises: a latent heat less than a latent heat of water at a phase change from liquid to gas; and a specific heat capacity less than a specific heat capacity of water in a liquid phase and in a gas phase.

In an embodiment, the predetermined working fluid is in a supercritical state when the kinetic energy drives the turbine.

In an embodiment, the boiling point of the predetermined working fluid is lower than a temperature of the geothermal energy source.

In an embodiment, the predetermined working fluid is utilized in the system based on a sum total of values assigned to physical and chemical properties of the predetermined working fluid, the physical and chemical properties including at least one of: boiling point, specific heat capacity, latent energy, phase status, specific enthalpy, specific entropy, supercriticality, flash point, specific heat storage capacity, and thermal conductivity.

In an embodiment, the values assigned to the boiling point, the specific heat capacity, and the latent energy have greater weight than the values assigned to the phase status, the specific enthalpy, the specific entropy, the supercriticality, the flash point, the specific heat storage capacity, and the thermal conductivity, the values assigned to the phase status, the specific enthalpy, the specific entropy, the supercriticality have greater weight than the values assigned to the flash point, the specific heat storage capacity, and the thermal conductivity, and the values assigned to the flash point and the specific heat storage capacity have greater weight than the value assigned to the thermal conductivity.

In an embodiment, the predetermined working fluid is utilized in the system based on a sum total of values assigned to Health, Safety and Environmental (HSE) properties of the predetermined working fluid, the Health, Safety and Environmental (HSE) properties including at least one of: flammability, harmfulness to humans, environmental friendliness, corrosiveness, and erosiveness.

In an embodiment, the value assigned to the flammability has a greater weight than the values assigned to the harmfulness to humans, the environmental friendliness, the corrosiveness, and the erosiveness, and the values assigned to the harmfulness to humans and the environmental friendliness have a greater weight than the values assigned to the corrosiveness and the erosiveness.

In an embodiment, the predetermined working fluid is utilized in the system based at least in part on a value assigned to a monetary cost of the predetermined working fluid.

In a further embodiment, a process of generating electricity from a geothermal energy source, comprising: selecting a predetermined primary fluid that comprises: a latent heat greater than a latent heat of water at a phase change from liquid to gas; and a specific heat capacity less than a specific heat capacity of water in a liquid phase and in a gas phase; selecting a predetermined secondary working fluid that comprises: a latent heat less than a latent heat of water at a phase change from liquid to gas; and a specific heat capacity less than a specific heat capacity of water in a liquid phase and in a gas phase; heating the predetermined primary fluid by absorbing thermal energy from the geothermal energy source to produce a heated primary fluid; exchanging the thermal energy of the heated primary fluid with the predetermined secondary working fluid in a heat exchanger to elevate a kinetic energy of the predetermined secondary working fluid; driving a turbine via the kinetic energy of the predetermined secondary working fluid; and driving an electricity generator by the turbine to generate electricity.

In an embodiment, the predetermined secondary working fluid is in a supercritical state when the kinetic energy drives the turbine.

In an embodiment, a boiling point of the predetermined primary fluid is lower than a temperature of the geothermal energy source, and the predetermined secondary working fluid has a lower boiling point than a temperature of the predetermined primary fluid at the heat exchanger.

In an embodiment, the process further comprises assigning values to physical and chemical properties of at least one of the predetermined primary fluid and the predetermined secondary working fluid, the physical and chemical properties including at least one of: boiling point, specific heat capacity, latent energy, phase status, specific enthalpy, specific entropy, supercriticality, flash point, specific heat storage capacity, and thermal conductivity, and utilizing the at least one of the predetermined primary fluid and the predetermined secondary working fluid in the process based on a sum total of the values.

In an embodiment, the values assigned to the boiling point, the specific heat capacity, and the latent energy have greater weight than the values assigned to the phase status, the specific enthalpy, the specific entropy, the supercriticality, the flash point, the specific heat storage capacity, and the thermal conductivity, the values assigned to the phase status, the specific enthalpy, the specific entropy, the supercriticality have greater weight than the values assigned to the flash point, the specific heat storage capacity, and the thermal conductivity, and the values assigned to the flash point and the specific heat storage capacity have greater weight than the value assigned to the thermal conductivity.

In an embodiment, the process further comprises assigning values to Health, Safety and Environmental (HSE) properties of at least one of the predetermined primary fluid and the predetermined secondary working fluid, the Health, Safety and Environmental (HSE) properties including at least one of: flammability, harmfulness to humans, environmental friendliness, corrosiveness, and erosiveness, and utilizing the at least one of the predetermined primary fluid and the predetermined secondary working fluid in the system based on a sum total of the values.

In an embodiment, the value assigned to the flammability has a greater weight than the values assigned to the harmfulness to humans, the environmental friendliness, the corrosiveness, and the erosiveness, and the values assigned to the harmfulness to humans and the environmental friendliness have a greater weight than the values assigned to the corrosiveness and the erosiveness.

In an embodiment, the process further comprises assigning a value to a monetary cost of at least one of the predetermined primary fluid and the predetermined secondary working fluid, and utilizing the at least one of the predetermined primary fluid and the predetermined secondary working fluid in the process based at least in part on the value.

In an embodiment, the predetermined primary fluid is comprised of one or more materials that provide the predetermined primary fluid with a latent heat that is at least greater than total heat loss from the geothermal energy source to maintain at least a boiling temperature of the predetermined primary fluid at the heat exchanger.

In another embodiment, a process of generating electricity from a geothermal energy source comprises: selecting a predetermined working fluid that comprises: a latent heat less than a latent heat of water at a phase change from liquid to gas; and a specific heat capacity less than a specific heat capacity of water in a liquid phase and in a gas phase; heating the predetermined working fluid by absorbing thermal energy from the geothermal energy source to elevate a kinetic energy of the predetermined working fluid; driving a turbine via the kinetic energy of the predetermined working fluid; and driving an electricity generator by the turbine to generate electricity.

In an embodiment, the predetermined working fluid is in a supercritical state when the kinetic energy drives the turbine.

In an embodiment, the boiling point of the predetermined working fluid is lower than a temperature of the geothermal energy source.

In an embodiment, the process further comprises assigning values to physical and chemical properties of the predetermined working fluid, the physical and chemical properties including at least one of: boiling point, specific heat capacity, latent energy, phase status, specific enthalpy, specific entropy, supercriticality, flash point, specific heat storage capacity, and thermal conductivity, and utilizing the predetermined working fluid in the process based on a sum total of the values.

In an embodiment, the values assigned to the boiling point, the specific heat capacity, and the latent energy have greater weight than the values assigned to the phase status, the specific enthalpy, the specific entropy, the supercriticality, the flash point, the specific heat storage capacity, and the thermal conductivity, the values assigned to the phase status, the specific enthalpy, the specific entropy, the supercriticality have greater weight than the values assigned to the flash point, the specific heat storage capacity, and the thermal conductivity, and the values assigned to the flash point and the specific heat storage capacity have greater weight than the value assigned to the thermal conductivity.

In an embodiment, the process further comprises assigning values to Health, Safety and Environmental (HSE) properties of the predetermined working fluid, the Health, Safety and Environmental (HSE) properties including at least one of: flammability, harmfulness to humans, environmental friendliness, corrosiveness, and erosiveness, and utilizing the predetermined working fluid in the system based on a sum total of the values.

In an embodiment, the value assigned to the flammability has a greater weight than the values assigned to the harmfulness to humans, the environmental friendliness, the corrosiveness, and the erosiveness, and the values assigned to the harmfulness to humans and the environmental friendliness have a greater weight than the values assigned to the corrosiveness and the erosiveness.

In an embodiment, the process further comprises assigning a value to a monetary cost of the predetermined working fluid, and utilizing the predetermined working fluid in the process based at least in part on the value.

In another embodiment, a thermal system for generating electricity comprises: a mechanical device comprising a shaft; a predetermined working fluid that absorbs thermal energy from a thermal energy source to become a heated working fluid having a sufficient amount of kinetic energy to perform work that turns the shaft of the mechanical device; and a generator that is driven via rotation of the shaft of the mechanical device to generate electricity by electromagnetic induction, wherein the thermal energy source is located at one of: on a surface of the earth, above the surface, and below the surface at a depth having a temperature insufficient to boil water.

In an embodiment, the thermal energy source is one of a flare, exhaust flue gas, a reactor, a refinery, a hot water tank, an engine, natural hot springs, volcanoes, and desert sand.

In an embodiment, the predetermined working fluid is in a supercritical state when the kinetic energy drives the shaft of mechanical device.

In a further embodiment, a thermal process for generating electricity, comprises: heating a predetermined working fluid by absorbing thermal energy from a thermal energy source to elevate a kinetic energy of the predetermined working fluid; performing work via the kinetic energy to drive a shaft of a mechanical device; and driving a generator via rotation of the shaft of the mechanical device to generate electricity by electromagnetic induction, wherein the thermal energy source is located at one of: on a surface of the earth, above the surface, and below the surface at a depth having a temperature insufficient to boil water.

In an embodiment, the thermal energy source is one of a flare, exhaust flue gas, a reactor, a refinery, a hot water tank, an engine, natural hot springs, volcanoes, and desert sand.

In an embodiment, the predetermined working fluid is in a supercritical state when the kinetic energy drives the shaft of mechanical device.

In yet another embodiment, a thermal system for generating electricity comprises: a mechanical device comprising a shaft; a thermal energy source comprising a heated working fluid having a sufficient amount of kinetic energy to perform work that turns the shaft of the mechanical device; and a generator that is driven via rotation of the shaft of the mechanical device to generate electricity by electromagnetic induction, wherein the thermal energy source is located at one of: on a surface of the earth, above the surface, and below the surface at a depth having a temperature insufficient to boil water.

In an embodiment, the heated working fluid is one of exhaust flue gas, a natural hot spring, and gas from a volcano.

In an embodiment, the heated working fluid is in a supercritical state when the kinetic energy drives the shaft of mechanical device.

In another embodiment, a thermal process for generating electricity comprises: heating a working fluid of a thermal energy source so that the working fluid has a sufficient amount of kinetic energy to perform work; performing the work via the kinetic energy to drive a shaft of a mechanical device; and driving a generator via rotation of the shaft of the mechanical device to generate electricity by electromagnetic induction, wherein the thermal energy source is located at one of: on a surface of the earth, above the surface, and below the surface at a depth having a temperature insufficient to boil water.

In an embodiment, the heated working fluid is one of exhaust flue gas, a natural hot spring, and gas from a volcano.

In an embodiment, the heated working fluid is in a supercritical state when the kinetic energy drives the shaft of mechanical device.

BRIEF DESCRIPTION OF THE FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein.

FIG. 2B is another schematic illustration of a geothermal system according to FIG. 1B implemented with a geothermal well according to another embodiment.

FIG. 4D show phase/state diagrams for fluids, according to an embodiment.

FIG. 5 is an example of the value matrix for selection or design of a working fluid to be utilized in a thermal system for generating electricity, according to an embodiment.

FIG. 7B illustrates an example of a Rankine Cycle that is implemented by a thermal energy system in which water is used as the working fluid and the thermal energy source is a flare.

DETAILED DESCRIPTION

Figure 1A:
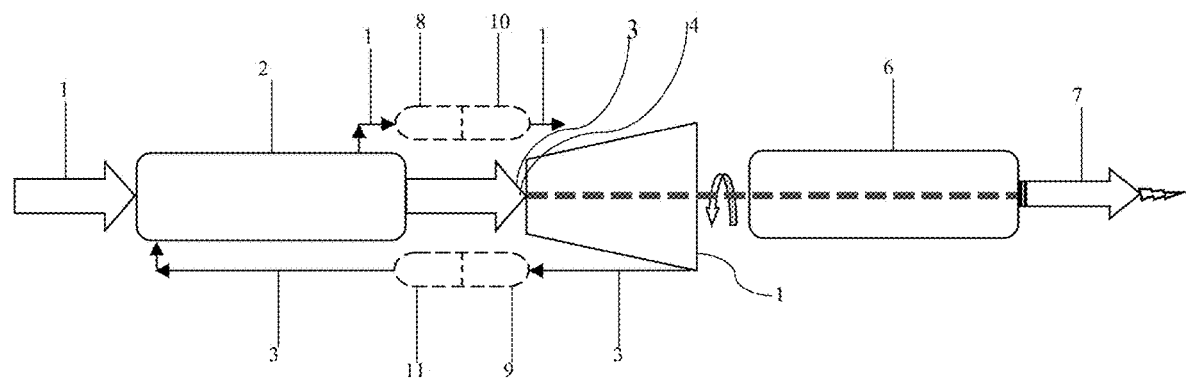
FIG. 1A is a schematic illustration of a thermal energy system according to a first embodiment.

While processes, systems and devices are described herein by way of examples and embodiments, those skilled in the art recognize the processes, systems and devices are not limited to the embodiments or drawings described. It should be understood that the drawings and description are not intended to be limited to the particular form disclosed. Rather, the intention is to cover all modifications, equivalents and alternatives falling within the spirit and scope of the appended claims and description. Any headings used herein are for organization purposes only and are not meant to limit the scope of the description of the claims. As used herein, the word "may" is used in a permissive sense (i.e., meaning having the potential to) rather than the mandatory sense (i.e., meaning must). Similarly, the words "include," "including," and "includes" mean including, but not limited to. The present disclosure describes particular embodiments and with reference to certain drawings, but the subject matter is not limited thereto.

The present disclosure will provide description to the accompanying drawings, in which some, but not all embodiments of the subject matter of the disclosure are shown. Indeed, the subject matter may be embodied in many different forms and should not be construed as limited to the embodiments set forth herein, rather, these embodiments are provided so that this disclosure satisfies all the legal requirements. The disclosure herein is illustrative and explanatory of one or more embodiments and variations thereof, and it will be appreciated that various changes in the design, organization, means of operation, structures and location, methodology, and use of mechanical equivalents may be made without departing from the spirit of the invention. Because many varying and different embodiments may be made within the scope of the concept(s) herein taught, and because many modifications may be made in the embodiments described herein, it is to be understood that the details herein are to be interpreted as illustrative and non-limiting.

Certain terminology is used in the following description for convenience only and is not limiting. Certain words used herein designate directions in the drawings to which reference is made. Unless specifically set forth herein, the terms "a," "an" and "the" are not limited to one element, but instead should be read consistent with the meaning of "one or more," "at least one," and "one or more than one." As used herein "another" means at least a second or more. The terminology includes the words noted above, derivatives thereof and words of similar import.

Use of the term "about", when used with a numerical value, is intended to include +/−10%. For example, if a number of amino acids is identified as about 200, this would include 180 to 220 (plus or minus 10%). Similarly, use of the term "approximately", when used with a numerical value, is intended to include +/−10%. For example, if a number of amino acids is identified as approximately 200, this would include 180 to 220 (plus or minus 10%).

Unless otherwise defined, all technical and scientific terms used herein have the same meaning as commonly understood by one of ordinary skill in the art.

FIG. 1A illustrates one embodiment of a thermal energy system that can be used with a thermal energy source to generate electricity. The thermal energy system may include a heat exchanger 2 that receives a primary fluid 1 from a thermal energy source. The thermal energy source may include, but is not limited to hot rock formations and reservoirs in underground geologic formations and/or geothermal wells (not shown in FIG. 1A). In a geothermal well, at least some portion of thermal energy from the thermal energy source is transferred as heat to the primary fluid 1 by heat exchange. Alternatively, the thermal energy source may be any one of: burners, such as a gas flare resulting from the burning process of natural gas associated with oil extraction; exhaust flue gas; exhaust emitted from an engine; heat conducted from oil and gas pipelines/flow lines; combustion occurring in an engine or a gas turbine; a reactor, such as a nuclear reactor and/or gas/vapor emitted from the cooling tower of a nuclear reactor; a refinery and/or gas/vapor emitted from the refinery; and commercial and residential heaters, such as water heaters, furnaces, ovens and stoves (i.e., "burners" that derive heat from a flame). The burning processes herein may also produce a kinetic energy fluid. Additionally, the thermal energy source may be any one of: natural hot springs, volcanoes, and desert sand.

With any of the above thermal energy sources, the primary fluid 1 absorbs the thermal energy from the thermal energy source. That is, the thermal energy source transfers thermal energy (i.e., heat) to raise the thermal energy and/or temperature of the primary fluid 1. The transferred heat from the thermal energy source can elevate the kinetic energy of the primary fluid 1 so that the heated primary fluid 1 may have a relatively high temperature and pressure. The thermal energy may be derived from the motion and vibration of molecules of the geothermal energy source.

The heat exchanger 2 transfers the thermal energy of the primary fluid 1 to a secondary working fluid 3. In the present disclosure, a heat exchanger 2 can be any mechanical device that transfers thermal energy from one substance (e.g., a higher thermal energy fluid) to another substance (e.g., a lower thermal energy fluid) via "conduction", "convection" and/or "radiation". As a non-limiting example, a shell and tube heat exchanger may be implemented with the thermal systems discussed herein. FIG. 1A thus illustrates a "binary system" involving two fluids: (i) a primary fluid 1 that is heated by absorbing thermal energy from the thermal energy source to produce a heated primary fluid 1; and secondary working fluid 3 that absorbs the thermal energy (heat) from the primary fluid 1 in the heat exchanger 2. Upon absorbing the thermal energy (heat) in the heat exchanger 2, the secondary working fluid 3 may increase its temperature, volume and pressure, and thus its enthalpy, and may change its phase/state from a liquid to a gas/vapor. The secondary working fluid 3 may also be heated and pressurized to the extent that the secondary working fluid 3 reaches a supercritical state. The structure of the heat exchanger 2 is not limited in the present disclosure to any particular design or configuration, so long as the heat exchanger 2 is operable to transfer heat from the thermal energy source to a working fluid (e.g., from a heated primary fluid 1 to a secondary working fluid 3). As examples, the heat exchanger 2 may be a finned tube heat exchanger, a shell and tube heat exchanger, or a plate heat exchanger. Other types of heat exchangers not listed here that may be used to transfer heat to the secondary working fluid 3 are within the scope of this invention. The heated secondary working fluid 3 is then directed from the heat exchanger 2 towards a turbine 5 or other mechanical device. In some instances, the heated secondary working fluid 3 may be considered as a kinetic energy fluid by virtue of its molecular movement to drive the turbine 5 or other mechanical device. The primary fluid 1 may also be considered as a kinetic energy fluid by virtue of its molecular movement. Kinetic energy is the energy of motion. This includes the movement of small atoms and molecules (microscopic kinetic energy). In general, a working fluid should have enough kinetic energy with low entropy to do work.

The heated secondary working fluid 3 (e.g., having a high pressure and high temperature) flows from the heat exchanger 2 into the turbine 5 or other mechanical device. In one embodiment, the turbine 5 may include a series of blades mounted on a shaft. As the heated secondary fluid 3, preferably in the supercritical gas state/phase, enters the turbine 5, its kinetic energy will exert a force to move the series of blades on the shaft. The force turns the blades, which rotates the shaft to drive the turbine 5. In the present disclosure, a turbine 5 is any mechanical device that performs work by using the kinetic energy of a fluid (e.g., the secondary working fluid 3 in a "binary" system, or a working fluid in a "single fluid" system). That is, a turbine may be a mechanical device or equipment that transfers kinetic energy to mechanical energy to perform work. Some examples of such mechanical devices include: a turbine having a series of blades on the shaft as discussed above; and a piston with a crank shaft that is turned by the kinetic energy. For instance, engines may include piston with a crank shaft. The shaft may be connected to the rotor of an electricity generator 6 (discussed below). The turbine 5 or other mechanical device, in turn, drives an electricity generator 6 to generate electricity 7 via electromagnetic induction. When used herein, the term "turbine" is mean to encompass the turbine 5 as discussed above or other mechanical devices that may include a shaft that is turned by kinetic energy and/or mechanical energy of a working fluid, such as an engine with a piston and a crank shaft that may be turned by kinetic energy and/or mechanical energy of a working fluid.

In the present disclosure, the electricity generator 6 is any mechanical/electrical device that changes kinetic energy to electrical energy. In one embodiment, the electricity generator 6 includes a rotor that is connected to the shaft of the turbine 5 (or crank shaft of a piston) so as to rotate with rotation of the shaft. The rotor of the electricity generator 6 may include a coil of copper wire (armature) that rotates in response to rotation of the shaft of the turbine 5. Two polar field magnets on either side of the armature create a magnetic field inside the in the electricity generator 6. As the rotor, shaft, and armature rotate, they move within the electric field created by the magnets. As the turbine 5 rotates the armature through the magnetic field, an electrical current is created within the copper coil of the armature. This process of generating electrical current is known as electromagnetic induction. The electricity 7 produced can be extracted from the electricity generator 6, and may be sent to an electrical grid for commercial distribution and use. In this regard, the frequency of the electricity 7 from the electricity generator 6 can be adjusted to the grid-line frequency of the grid to synchronize the transmission. The faster the electricity generator 6 is driven, the more electricity 7 it can produce.

Two main factors for having a significant amount of kinetic energy entering the turbine 5 can be a supercritical state of the fluid and the flow rate of the fluid. A fluid attains supercriticality when a pressure of the fluid reaches its critical pressure and a temperature of the fluid reaches its critical temperature. This critical point is illustrated in the diagrams shown in FIG. 4D, discussed below. Accordingly, the secondary working fluid 3 becomes supercritical when the pressure and temperature of the secondary working fluid 3 reaches the critical point. The following table lists the critical pressure, critical temperature and other properties for water, and for some other fluids that may be used as working fluids in the thermal energy systems discussed herein.

TABLE 1

Supercritical Properties of Some Fluids

| Fluid | Molecular Mass g/mol | Critical Temperature ° C. | Critical Pressure MPa (atm) | Critical Density g/cm³ |
| --- | --- | --- | --- | --- |
| Carbon Dioxide ($CO_2$) | 44.01 | 30.95 | 7.38 (72.8) | 0.469 |
| Water ($H_2O$) | 18.015 | 373.946 | 22.064 (217.755) | 0.322 |
| Methane ($CH_4$) | 16.04 | −82.75 | 4.60 (45.4) | 0.162 |
| Ethane ($C_2H_6$) | 30.07 | 32.15 | 4.87 (48.1) | 0.203 |
| Propane ($C_3H_8$) | 44.09 | 96.65 | 4.25 (41.9) | 0.217 |
| Ethylene ($C_2H_4$) | 28.05 | 9.25 | 5.04 (49.7) | 0.215 |
| Ethylene ($C_2H_4$) | 42.08 | 91.75 | 4.60 (45.4) | 0.232 |
| Methanol ($CH_3OH$) | 32.04 | 239.45 | 8.09 (79.8) | 0.272 |
| Ethanol ($C_2H_5OH$) | 46.07 | 240.75 | 6.14 (60.6) | 0.276 |
| Acetone ($C_3H_6O$) | 58.08 | 234.95 | 4.70 (46.4) | 0.278 |
| Nitrous oxide ($N_2O$) | 44.013 | 33.42 | 7.35 (72.5) | 0.452 |

A fluid in the supercritical state will have higher kinetic energy, and thus and create more work. More kinetic energy will cause the shaft to turn faster, and eventually more electricity 7 generated by electromagnetic induction. As the heat increases and distance of molecules of vapor/gas increases, kinetic energy also increases. Superheated gas and plasma have a significant amount of kinetic energy that can produce the most work and generate more amounts of electricity 7 via the electricity generator 6.

A higher flowrate of the fluid will also create more work due to its higher magnitude of impact on the blades of the turbine 5. More work has the potential to subsequently generate more electricity 7. In this regard, the thermal system may optionally include a nozzle 4 (or expansion valve) provided between the heat exchanger 2 and the turbine 5, so that the high pressure and temperature secondary working fluid 3 passes through the nozzle 4 before entering the turbine 5. The nozzle 4 provides a restriction in the path of the heated secondary working fluid 3 in order to transfer some of the pressure of the heated secondary working fluid 3 to velocity, and thus expand the volume of the heated secondary working fluid 3. The nozzle 4 may be a fixed restriction in the path of the heated secondary working fluid 3, or may be an adjustable expansion valve that can be controlled, e.g., electronically or manually, to adjust the size of the restriction based on system conditions, a desired temperature and/or pressure of the heated secondary working fluid 3, or other considerations.

The pressure of the heated secondary working fluid 3 after driving the turbine 5 is reduced, such that the heated secondary working fluid 3 exiting the turbine 5 is in a low pressure, high temperature state. In this state, the heated secondary working fluid 3 may be conveyed to a condenser 9 to reduce the temperature of the heated secondary working fluid 3. In the present disclosure, a condenser is any mechanical device that lowers temperature of a fluid, such as by exchanging heat with ambient air in the condenser 9. In some embodiments, the condenser 9 may not be required, and may be omitted. Reducing the temperature of the heated secondary working fluid 3 is beneficial because a lower (cooler) temperature allows the secondary working fluid 3 to subsequently absorb more heat from the thermal energy of the primary fluid 1 in the heat exchanger 2 and thus increases the efficiency in reusing the secondary working fluid 3 in a cyclic thermodynamic process. In an embodiment, the condenser 9 exchanges or extracts the heat of the high temperature secondary working fluid 3 (which may be in a superheated gas/vapor phase) with the ambient temperature of the air in the condenser 9 which causes the secondary working fluid 3 to cool. Thus, the secondary working fluid 3 exiting the condenser 9 may have a decreased temperature along with the decreased pressure.

The secondary working fluid 3 having a decreased temperature and pressure may be reheated by the primary fluid 1 in the heat exchanger 2 and used again in the electricity generating process. In order to maximize heat absorption from the primary fluid 1 in the heat exchanger 2, the secondary working fluid 3 conveyed from the condenser 9 may pass through a compressor 11 to increase the pressure of the secondary working fluid 3. In the present disclosure, a compressor is any mechanical device that elevates pressure of a fluid. In some embodiments, the compressor 11 may not be required, and may be omitted. The compressor 11 may be a pump when the secondary working fluid 3 is in a liquid phase. The increase in pressure may change the secondary working fluid 3 leaving the compressor 11 to a liquid state with high pressure and low temperature. This high pressure, low temperature secondary working fluid 3 may then be conveyed back to the heat exchanger 2 to reabsorb heat provided by the thermal energy from the primary fluid 1 (which is heated by the thermal energy source). The process of generating electricity 7 from the thermal energy source described above may then be repeated in a repetitive, cyclic manner to continually generate electricity 7 (e.g., green energy).

In some embodiments, the primary fluid 1 after exchanging thermal energy with the secondary working fluid 3 in the heat exchanger 2 may be conveyed back to the thermal energy source (e.g., back into the well of a geothermal system) to again absorb thermal energy from the thermal energy source in the manner discussed above. The primary fluid 1 may then be recirculated through the heat exchanger 2 to exchange the thermal energy with the secondary working fluid 3 in a subsequent thermodynamic cycle. The pressure of the heated primary fluid 1 exiting the heat exchanger 2 after exchanging thermal energy with the secondary working fluid 3 may be reduced, such that the heated primary fluid 1 may be in a low pressure, high temperature state. In this state, the heated primary fluid 1 may optionally be conveyed to a condenser 8 to reduce the temperature of the heated primary fluid 1 (in some embodiments, the condenser 8 may not be required, and may be omitted). Reducing the temperature of the heated primary fluid 1 can be beneficial because a lower (cooler) temperature allows the primary fluid 1 to subsequently absorb more heat from the thermal energy source. Absorbing more heat from the thermal energy source increases the efficiency in reusing the primary fluid 1 in a cyclic thermodynamic process. In an embodiment, the condenser 8 exchanges or extracts the heat of the high temperature primary fluid 1 with the ambient temperature of the air in the condenser 8, which causes the primary fluid 1 to cool. Thus, the primary fluid 1 exiting the heat exchanger 2 may have a decreased temperature along with the decreased pressure.

In order to maximize heat absorption from the thermal energy source, the primary fluid 1 may optionally be conveyed from the condenser 8 to a compressor 10 to increase the pressure of the primary fluid 1. In some embodiments however, the compressor 10 may not be required, and may be omitted. The compressor 10 may be a pump when the primary fluid 1 is in a liquid phase. The increase in pressure may change the primary fluid 1 leaving the compressor 10 to a liquid state with high pressure and low temperature. This high pressure, low temperature primary fluid 1 may then be conveyed back to thermal energy source to reabsorb heat provided by the thermal energy source, as discussed above.

Figure 1B:
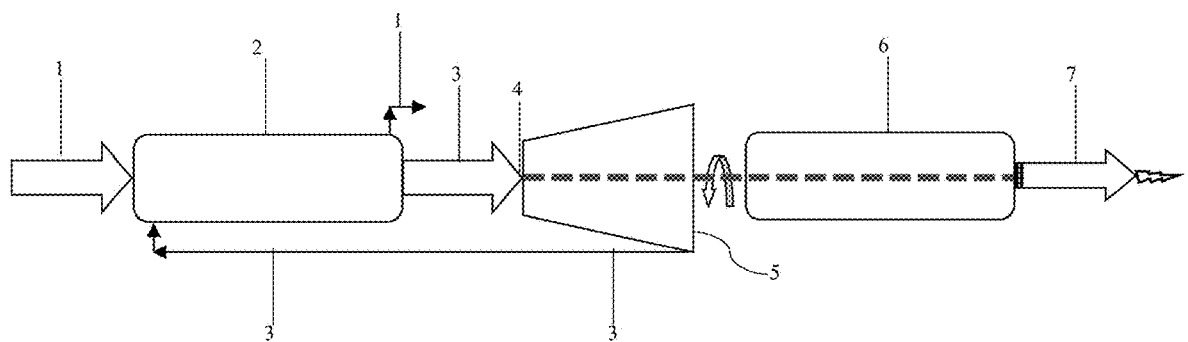
FIG. 1B is a schematic illustration of a thermal energy system according to a second embodiment.

FIG. 1B illustrates a second embodiment of a thermal energy system that can be used with a thermal energy source to generate electricity. The thermal energy system in FIG. 1B is similar to the one described above with respect to FIG. 1A, and the component parts of the thermal energy systems identified with the same reference numerals in both embodiments may be the same and operate in the same manner. The thermal energy system in FIG. 1B excludes the condenser 9 and the compressor 11 that is included in the thermal energy system in FIG. 1A. Thus, in the thermal energy system of FIG. 1B, the heated secondary working fluid 3 exiting the turbine 5 is conveyed to the heat exchanger 2 in a low pressure, high temperature state. In the heat exchanger 2, the low pressure/high temperature heated secondary working fluid 3 absorbs thermal energy from the heated primary fluid 1. The heated secondary working fluid 3 may then be conveyed to the turbine 5 to drive the turbine 5 as discussed above. Optionally, the heated secondary working fluid 3 may pass through the nozzle 4 before entering the turbine 5. The thermal energy system in FIG. 1B also excludes the condenser 8 and the compressor 10 that accommodates the heated primary fluid 1 exiting the heat exchanger 2 in the thermal energy system of FIG. 1A. In this case, the primary fluid 1 exiting the heat exchanger 2 may be conveyed back to the thermal energy source without passing through the condenser 8 and the compressor 10, to again absorb thermal energy from the thermal energy source. The heated primary fluid 1 may then be recirculated through the heat exchanger 2 to exchange the thermal energy with the secondary working fluid 3 in a subsequent thermodynamic cycle.

Figure 1C:
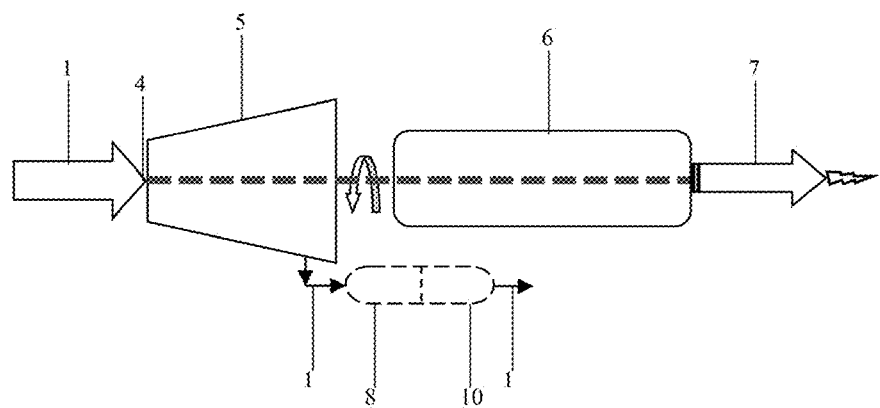
FIG. 1C is a schematic illustration of a thermal energy system according to a third embodiment.

FIG. 1C illustrates a third embodiment of a thermal energy system that can be used with a thermal energy source to generate electricity. The thermal energy system in this embodiment is a "single fluid" system, as opposed to the "binary" systems in FIGS. 1A and 1B that implement both a primary working fluid and a secondary working fluid. In the "single fluid" system of FIG. 1C, the thermodynamic process implemented by the thermal energy system uses only the primary fluid 1 as a working fluid to drive the turbine 5, and the heat exchanger 2 of FIGS. 1A and 1B is thus excluded. Other component parts that are shared by the thermal energy systems in FIG. 1A to 1C and identified with the same reference numerals may be the same and operate in the same manner. In the thermal energy system of FIG. 1C, at least some portion of thermal energy from the thermal energy source is transferred as heat to the primary working fluid 1 by heat exchange. The primary working fluid 1 absorbs the thermal energy of the thermal energy source to raise the thermal energy and/or temperature of the primary working fluid 1, as discussed above. As also discussed above, the transferred heat from the thermal energy source can elevate the kinetic energy of the primary working fluid 1 so that the heated primary working fluid 1 may have a relatively high temperature and pressure. Upon absorbing the thermal energy (heat) from the thermal energy source, the primary working fluid 1 may increase its temperature, volume and pressure, and thus its enthalpy, and may change its phase/state from a liquid to a gas/vapor. The primary working fluid 1 may also be heated to the extent that it reaches a supercritical state. In some instances, the heated primary working fluid 1 may be considered as a kinetic energy fluid by virtue of its molecular movement.

In the thermal energy system of FIG. 1C, the heated primary working fluid 1 (e.g., having a high pressure and high temperature) flows from the well to the turbine 5. Optionally, the heated primary working fluid 1 may pass through the nozzle 4 before entering the turbine 5. As the heated primary working fluid 1, preferably in the supercritical gas state/phase, enters the turbine 5, its kinetic energy will exert a force to move the series of blades on the shaft of the turbine 5 as discussed above. As discussed above, the force turns the blades, which rotates the shaft to drive the turbine 5. The turbine 5, in turn, drives an electricity generator 6 to generate electricity 7 via electromagnetic induction. The electricity 7 produced can be extracted from the electricity generator 6 and sent to an electrical grid for commercial distribution and use. The frequency of the electricity 7 from the electricity generator 6 can be adjusted to the grid-line frequency of the grid to synchronize the transmission, as discussed above.

The pressure of the heated primary working fluid 1 after driving the turbine 5 may be reduced, such that the heated primary working fluid 1 exiting the turbine 5 is in a low pressure, high temperature state. In this state, the heated primary working fluid 1 may be conveyed to the condenser 8 to reduce the temperature of the heated primary working fluid 1. Reducing the temperature of the heated primary working fluid 1 is beneficial because a lower (cooler) temperature allows the primary working fluid 1 to subsequently absorb more heat from the thermal energy of the thermal energy source, and thus increases the efficiency in reusing the primary working fluid 1 in a cyclic thermodynamic process as discussed above. In an embodiment, the condenser 8 exchanges or extracts the heat of the high temperature primary working fluid 1 (which may be in a superheated gas/vapor phase) with the ambient temperature of the air in the condenser 8 which causes the primary working fluid 1 to cool. Thus, the primary working fluid 1 exiting the condenser 8 may have a decreased temperature along with the decreased pressure.

The primary working fluid 1 having a decreased temperature and pressure may be conveyed back to the thermal energy source to be reheated by the thermal energy source and used again in the electricity generating process. In order to maximize heat absorption from the thermal energy source, the primary working fluid 1 conveyed from the condenser 8 may pass through the compressor 10 to increase the pressure of the primary working fluid 1. The increase in pressure may change the primary working fluid 1 leaving the compressor 8 to a liquid state with high pressure and low temperature. This high pressure, low temperature primary working fluid 1 may then be conveyed back to the thermal energy source to reabsorb heat provided by the thermal energy from the thermal energy source. The process of generating electricity 7 from the thermal energy source may then be repeated in a repetitive, cyclic manner to generate electricity 7 (e.g., green energy) as discussed above.

Figure 1D:
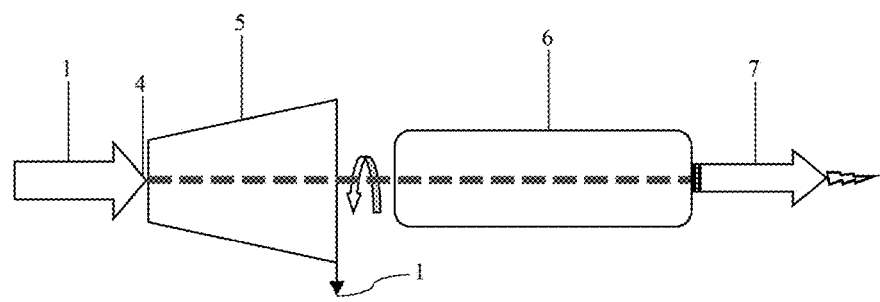
FIG. 1D is a schematic illustration of a thermal energy system according to a fourth embodiment.

FIG. 1D illustrates a fourth embodiment of a thermal energy system that can be used with a thermal energy source to generate electricity. The thermal energy system in FIG. 1D is similar to the one described above with respect to FIG. 1C, and the component parts of the thermal energy systems identified with the same reference numerals in both embodiments may be the same and operate in the same manner. The thermal energy system in FIG. 1D excludes the condenser 8 and the compressor 10 that is included in the thermal energy system in FIG. 1C. Thus, in the thermal energy system of FIG. 1D, the heated primary working fluid 1 exiting the turbine 5 is conveyed to the thermal energy source in a low pressure, high temperature state without passing through the condenser 8 and the compressor 10. The low pressure/high temperature heated primary working fluid 1 absorbs thermal energy from the thermal energy source. The heated primary working fluid 1 may then be conveyed to the turbine 5 to drive the turbine 5 as discussed above. Optionally, the heated primary working fluid 1 may pass through the nozzle 4 before entering the turbine 5.

Figure 2A:
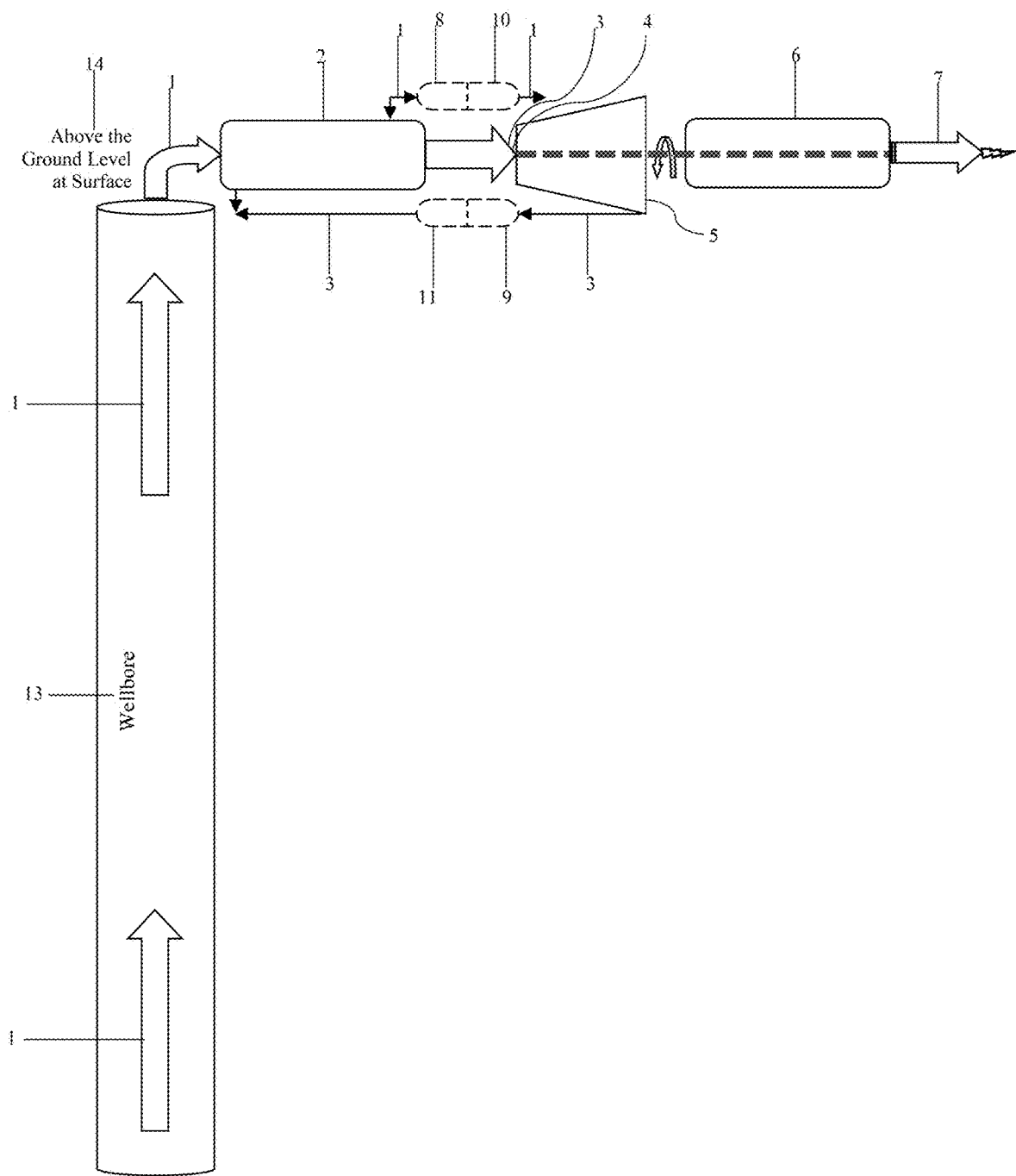
FIG. 2A is a schematic illustration of a geothermal system according to FIG. 1A implemented with a geothermal well according to an embodiment.

FIG. 2A illustrates an embodiment of the thermal energy system of FIG. 1A implemented with a geothermal well 13. The well 13 may extend to a geothermal energy source (not shown), which may be a hot rock formation or reservoir in the underground geologic formation as discussed above. The geothermal system is located at the surface 14. The component parts of the thermal energy systems identified with the same reference numerals in FIGS. 1A and 2A may be the same and operate in the same manner. A primary fluid 1 is circulated or otherwise provided in the well 13 to absorb thermal energy from the geothermal energy source to produce a heated primary fluid 1 as discussed above. The geothermal system intakes the heated primary fluid 1 into the heat exchanger 2, and may operate in the manner discussed above with respect to FIG. 1A to generate electricity 7. The electricity 7 may be conveyed to the electrical grid for commercial distribution and use as discussed above. The heated primary fluid 1 may contain a sufficient amount of thermal energy to change the secondary fluid 3 to a supercritical state or a gaseous state when absorbing the thermal energy from the primary fluid 1 in the heat exchanger 2.

FIG. 2B illustrates an embodiment of the thermal system of FIG. 1B implemented with a geothermal well 13 which may extend to a geothermal energy source (not shown). The geothermal energy source may be a hot rock formation or reservoir in the underground geologic formation as discussed above. The geothermal system is located at the surface 14. The component parts of the thermal energy systems identified with the same reference numerals in FIGS. 1B and 2B may be the same and operate in the same manner. The geothermal system intakes the heated primary fluid 1 into the heat exchanger 2, and may operate in the manner discussed above with respect to FIG. 1B to generate electricity 7.

Figure 2C:
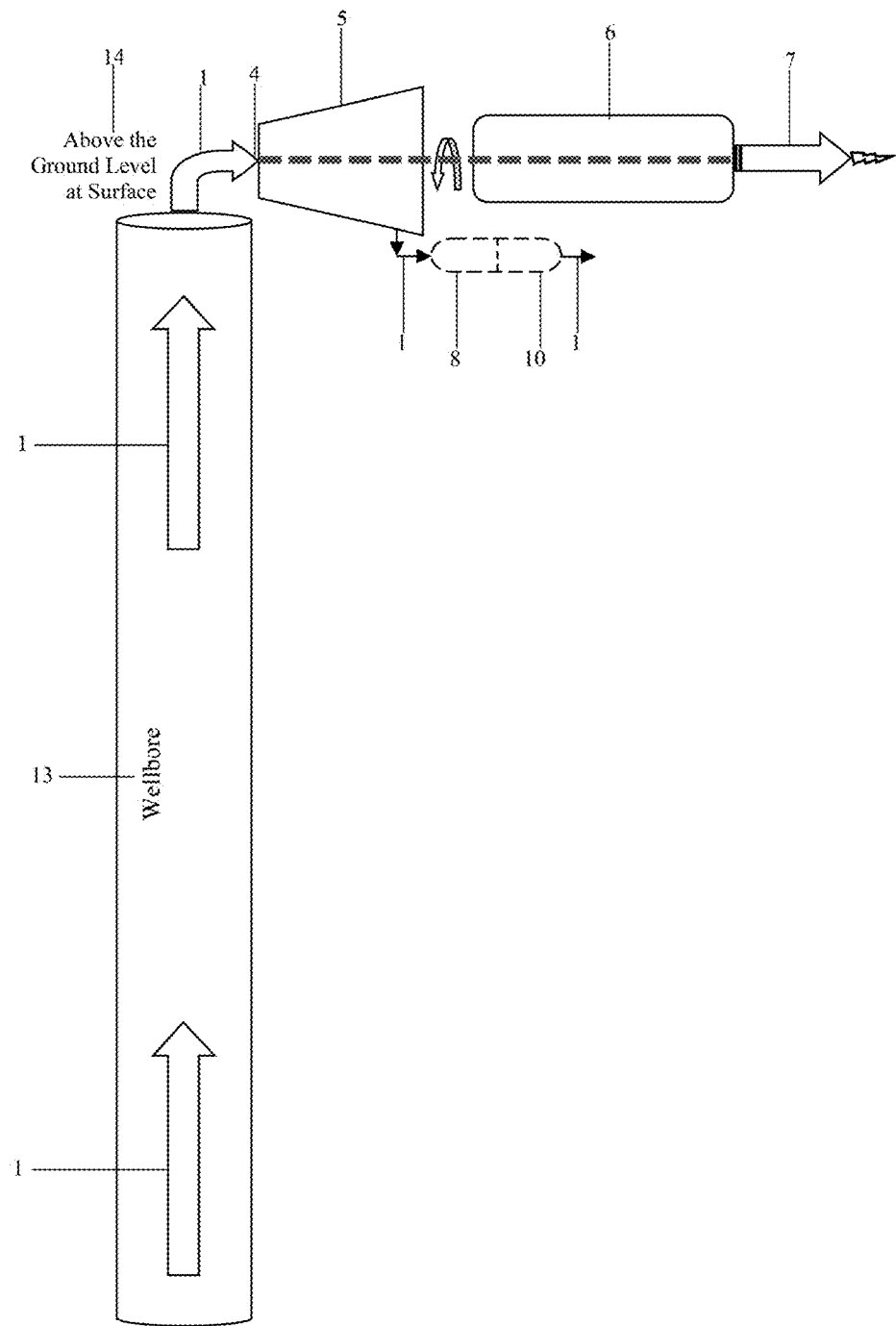
FIG. 2C is a further schematic illustration of a geothermal system according to FIG. 1C implemented with a geothermal well according to a further embodiment.

FIG. 2C illustrates an embodiment of the thermal system of FIG. 1C implemented at the surface 14 with a geothermal well 13 that extends to a geothermal energy source (not shown). As discussed above, the geothermal energy source may be a hot rock formation or reservoir in the underground geologic formation. The component parts of the thermal energy systems identified with the same reference numerals in FIGS. 1C and 2C may be the same and operate in the same manner. As discussed above, this geothermal system uses the primary working fluid 1 to drive the turbine 5 as discussed above with respect to FIG. 1C. In the system of FIG. 1C, the primary working fluid 1 may change to a supercritical state or a gaseous state when absorbing thermal energy from the geothermal energy source.

Figure 2D:
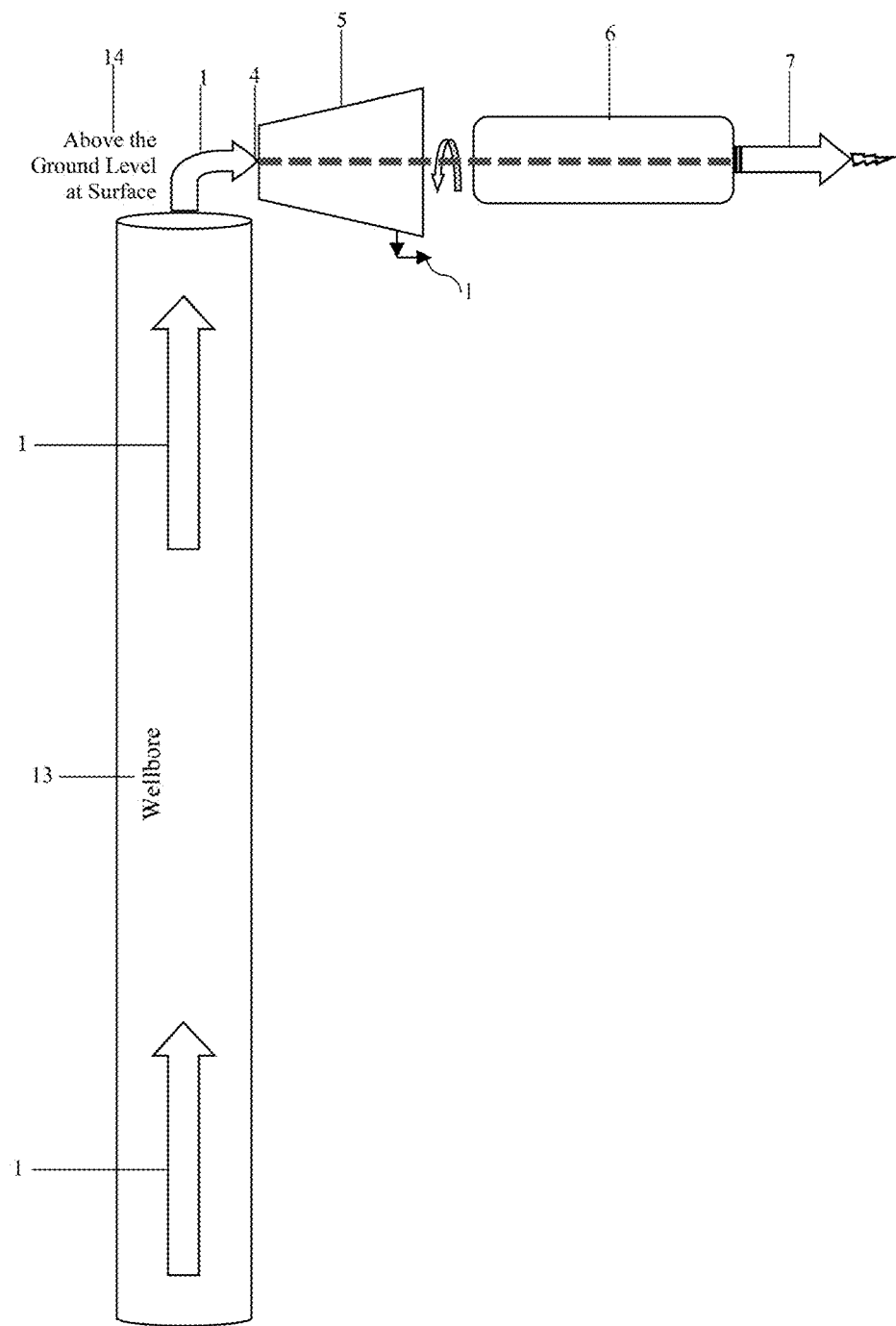
FIG. 2D is yet another schematic illustration of a geothermal system according to FIG. 1D implemented with a geothermal well according to yet another embodiment.

FIG. 2D illustrates an embodiment of the thermal system of FIG. 1D implemented at the surface 14 with a geothermal well 13. The well 13 may extend to a geothermal energy source (not shown) as discussed above. The geothermal system is located at the surface 14. The component parts of the thermal energy systems identified with the same reference numerals in FIGS. 1D and 2D may be the same and operate in the same manner. The geothermal power plant intakes the heated primary working fluid 1 into the turbine 5 as discussed above, and may operate in the manner discussed above with respect to FIG. 1D to generate electricity 7.

Figure 2E:
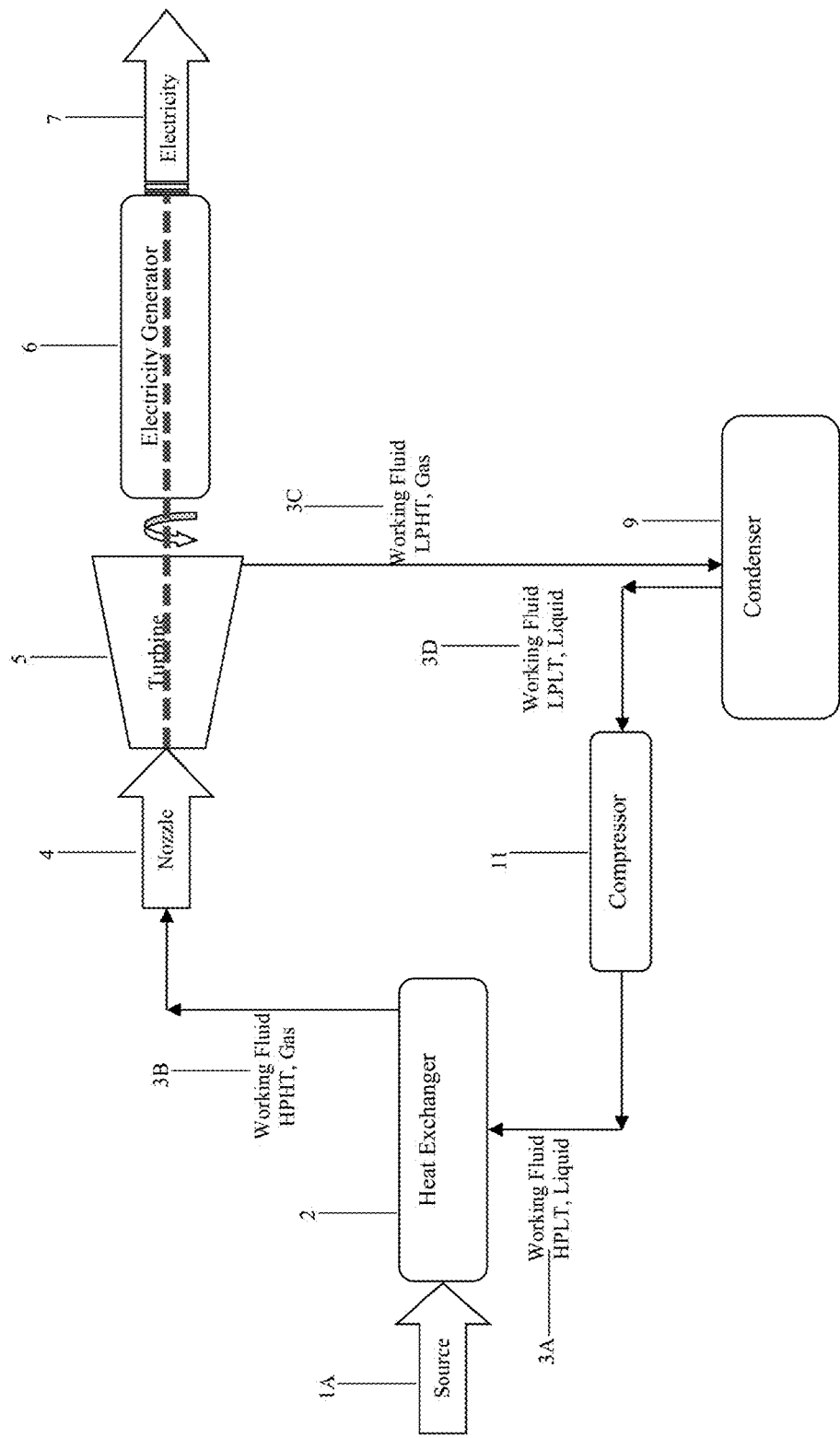
FIG. 2E is a schematic illustration of a thermal energy system according to an embodiment.

FIG. 2E illustrates an embodiment of a thermal energy system for generating electricity in which the thermal energy source 1A is an energy source other than a geothermal energy source. The thermal energy system in FIG. 2E is similar to the ones described above with respect to FIG. 1A, and the component parts of the systems identified with the same reference numerals in the embodiments may be the same and operate in the same manner. The thermal energy source 1A may be any one of: burners, such as a gas flare resulting from the burning process of natural gas associated with oil extraction; exhaust flue gas; exhaust emitted from an engine; heat conducted from oil and gas pipelines/flow lines; combustion occurring in an engine or a gas turbine; a reactor, such as a nuclear reactor and/or gas/vapor emitted from the cooling tower of a nuclear reactor; a refinery and/or gas/vapor emitted from the refinery; and commercial and residential heaters, such as water heaters, furnaces, ovens and stoves (i.e., "burners" that derive heat from a flame). The burning processes herein may also produce a kinetic energy fluid. Additionally, the thermal energy source 1A may be any one of: natural hot springs, volcanoes, and desert sand. The thermal energy sources listed above provide viable alternatives to the geothermal energy sources that are found only in deep geothermal wells, and can be used to provide a sufficient amount of work to generate electricity when paired with the predetermined primary and working fluids discussed herein. The alternative thermal energy sources discussed above may be characterized as being located on the surface of the earth or above the surface of the earth. Moreover, by utilizing the predetermined primary and working fluids discussed herein, geothermal energy sources in shallow wells may be used to provide a sufficient amount of work to generate electricity. A geothermal energy source in a "shallow" well is one in which the geothermal energy source is at a depth having a temperature insufficient to boil water. For instance, water boils at 100 degrees C. (212 degrees F.) at atmospheric pressure, and so a depth less than a location in a well where the geothermal energy source has this temperature (100 degrees C. (212 degrees F.)) at atmospheric pressure would be considered a "shallow" well. If the given pressure in the well is less than or greater than atmospheric pressure, then a depth less than a location where the geothermal energy source provides an amount of heat (or temperature) to boil water at the given pressure in the well would be considered "shallow", and the geothermal energy source would be considered as being in a "shallow" well rather than a deep well as used conventionally.

At least some portion of thermal energy from the thermal energy source 1A is transferred as heat to the predetermined working fluid 3A by heat exchange in the heat exchanger 2. Upon absorbing the thermal energy (heat) in the heat exchanger 2, the predetermined working fluid 3A may increase its temperature, volume and pressure, and thus its enthalpy, and may change its phase/state from a liquid to a gas/vapor. The predetermined heated working fluid 3B is then directed from the heat exchanger 2 towards the turbine 5 or other mechanical device, such as a piston with a crank shaft of an engine. The nozzle 4 may be provided between the heat exchanger 2 and the turbine 5 or mechanical device, so that the high pressure and temperature predetermined working fluid 3B passes through the nozzle 4 before entering the turbine 5 or mechanical device. In other embodiments, the nozzle 4 may not be required, and may be omitted. As the predetermined heated working fluid 3B, preferably in the supercritical gas state/phase, enters the turbine 5 or mechanical device, its kinetic energy will move a series of blades mounted on the shaft of the turbine 5 or mechanical device as discussed above. As discussed above, the force turns the blades, which rotates the shaft to drive the turbine 5 or mechanical device. The turbine 5 or other mechanical device, in turn, drives the electricity generator 6 to generate electricity 7 via electromagnetic induction as discussed above. The electricity 7 produced can be extracted from the electricity generator 6, and may be sent to an electrical grid for commercial distribution and use as discussed above.

The predetermined heated working fluid 3C exiting the turbine 5 after driving the turbine 5 may be conveyed to the condenser 9 in a superheated gas/vapor state, as discussed above. In this state, the predetermined working fluid 3C may have a decreased pressure, but a still relatively high temperature. The condenser 9 cools the superheated gas/vapor working fluid 3C so that the predetermined low pressure, low temperature working fluid 3D exiting the condenser 9 may have a decreased temperature along with the decreased pressure. The lower temperature of the predetermined working fluid 3D is beneficial because a lower (cooler) temperature allows the heated predetermined working fluid 3D to absorb more heat from the energy source 1A. The efficiency in reusing the heated working fluid 3D in a cyclic thermodynamic process is thus increased. The predetermined working fluid 3D exiting the condenser 9 may then be conveyed to the compressor 11 to increase the pressure of the predetermined heated working fluid 3D, and change the state of the predetermined working fluid 3D to a liquid state with high pressure and low temperature. The high pressure, low temperature predetermined heated working fluid 3A may then be conveyed back to the heat exchanger 2 to reabsorb heat provided by the energy source 1A. The process described above may then be repeated in a repetitive, cyclic manner to generate electricity.

In some embodiments, the thermal energy source 1A itself may be the heated working fluid. For instance, the heated working fluid may be one of exhaust flue gas, a natural hot spring, and gas from a volcano, that enters into the turbine 5. The thermal energy source 1A (i.e., heated working fluid) may have a sufficient amount of kinetic energy to turn the shaft of the turbine 5 or mechanical device as discussed above. As discussed above, the turbine 5 or mechanical device drives the electricity generator 6 to generate electricity 7 via electromagnetic induction. The electricity 7 produced can be extracted from the electricity generator 6, and may be sent to an electrical grid for commercial distribution and use as discussed above. Other thermal energy sources, such as those discussed above which may be located on a surface of the earth, above the surface, and below the surface at a depth having a temperature insufficient to boil water, may be the heated working fluid that enters into the turbine 5 or mechanical device to drive the turbine 5 or mechanical device (and ultimately, the electricity generator 6) as discussed above. In these cases, the thermal energy source 1A as the heated working fluid may be in the supercritical state when driving the shaft of the turbine 5 or mechanical device.

Figure 2F:
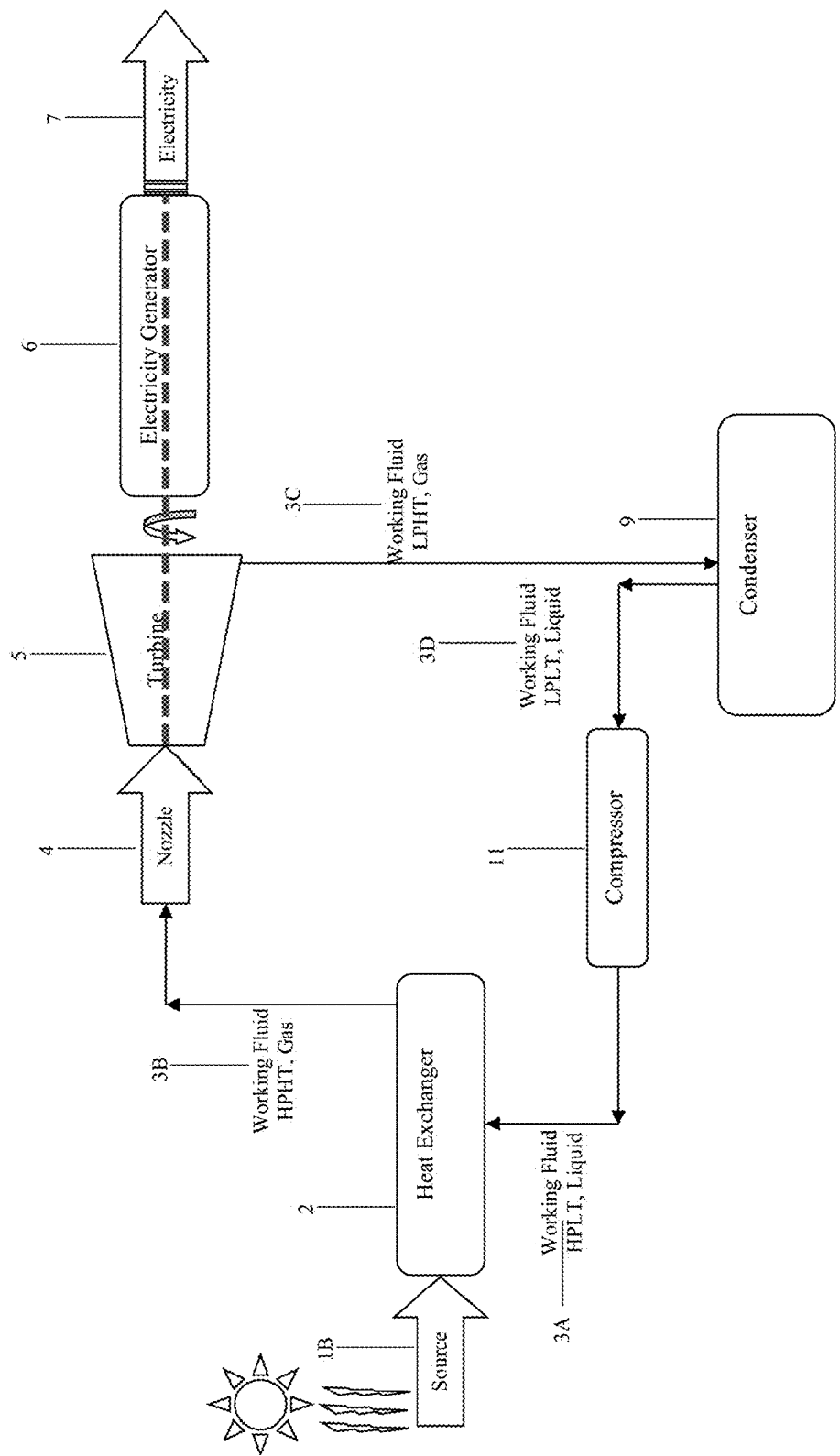
FIG. 2F is a schematic illustration of a system that uses solar energy as a source of thermal energy, according to an embodiment.

FIG. 2F illustrates an embodiment of a thermal energy system for generating electricity in which the thermal energy source 1B is solar energy. The thermal energy system in FIG. 2F is similar to the ones described above with respect to FIG. 2E, and the component parts of the systems identified with the same reference numerals in the embodiments may be the same and operate in the same manner. The difference between the system in FIG. 2F and the one in FIG. 2E is that the energy source 1B in FIG. 2F is a solar energy source. Solar energy is generated by the sun. Thermal energy from the solar energy source 1B may be applied to a predetermined primary fluid, such as molten salt, to raise the temperature of the predetermined primary fluid. That is, the predetermined primary fluid absorbs heat from the solar energy source 1B and becomes a heated primary fluid. The solar energy may be harnessed by using concaved lenses or mirrors to concentrate photons from the sun's rays into the center of a lens or mirror to melt salt. The concentration of photons generates thermal energy that is applied to the predetermined primary fluid. The heated primary fluid transfers its thermal energy (heat) to the predetermined secondary working fluid 3A in the heat exchanger 2. In an alternative embodiment, the thermal energy from the solar energy source 1B may be applied directly to the predetermined secondary working fluid 3A (i.e., without the primary fluid). That is, the predetermined secondary working fluid 3A can absorb the solar thermal energy directly from sun.

In each of the thermal energy systems discussed above, the type of fluid(s) utilized in the systems can be a critical factor for minimizing heat loss and maximizing thermal energy absorption, and therefore maximizing electricity generation. The present disclosure encompasses selecting existing fluid(s) (i.e., "Fluid Selection"), which have favorable thermodynamic properties that help minimize heat loss and maximize thermal energy absorption, as primary and working fluid to be implemented in the thermal energy systems. The existing fluids may be implemented as primary or working fluids based on well conditions without modification or change in the thermodynamic properties of the fluids. The present disclosure also encompasses the creation of a primary and/or working fluids by mixing together two or more existing fluids to produce a designed fluid with specific desirable thermodynamic characteristics (i.e., "Fluid Design") tailored to specific thermal conditions and/or circumstances present in or at the thermal energy source. Fluid Selection and Fluid Design are discussed in more detail below with respect to FIG. 5.

Figure 3:
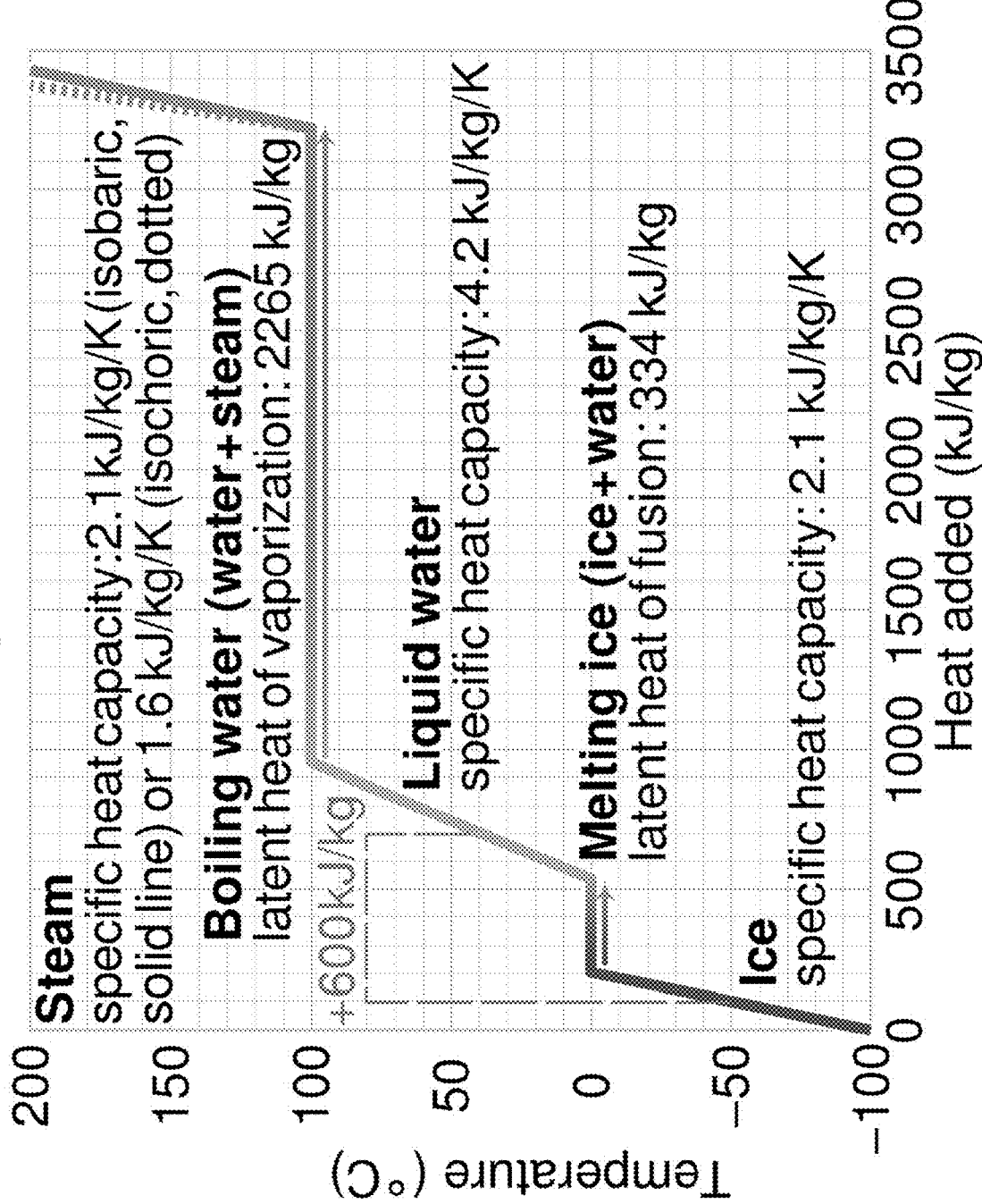
FIG. 3 is a graph showing some characteristics of water during phase changes at atmospheric pressure.

For reference, FIG. 3 shows a graph of some thermodynamic characteristics of water with respect to temperature (y-axis) and heat (x-axis) during phase changes at atmospheric pressure. In particular, the latent heat required for water to change from a solid (ice) to a liquid is 334 kJ/kg. The water in liquid form has a specific heat capacity of 4.2 kJ/kg/K. The latent heat required for water to change from a liquid solid to a gas (steam) is 2265 kJ/kg, and the water in gas form (steam) has a specific heat capacity of 2.1 kJ/kg/K. Because the latent heat of water at a phase change from liquid to gas may be smaller than the latent heat of other potential fluids at a phase change from liquid to gas, water may not maintain as much heat as those other fluids. Further, the specific heat capacity of water in the liquid and gas phases may be greater than other potential fluids in the liquid and gas phases, such that the highest temperature water can obtain may not be as great as the temperature other potential fluids can obtain. Accordingly, water may not be an efficient working fluid for minimizing heat loss and maximizing the absorption of thermal energy as other fluids that may be selected for utilization as a working fluid in thermal energy systems.

Figure 4A:
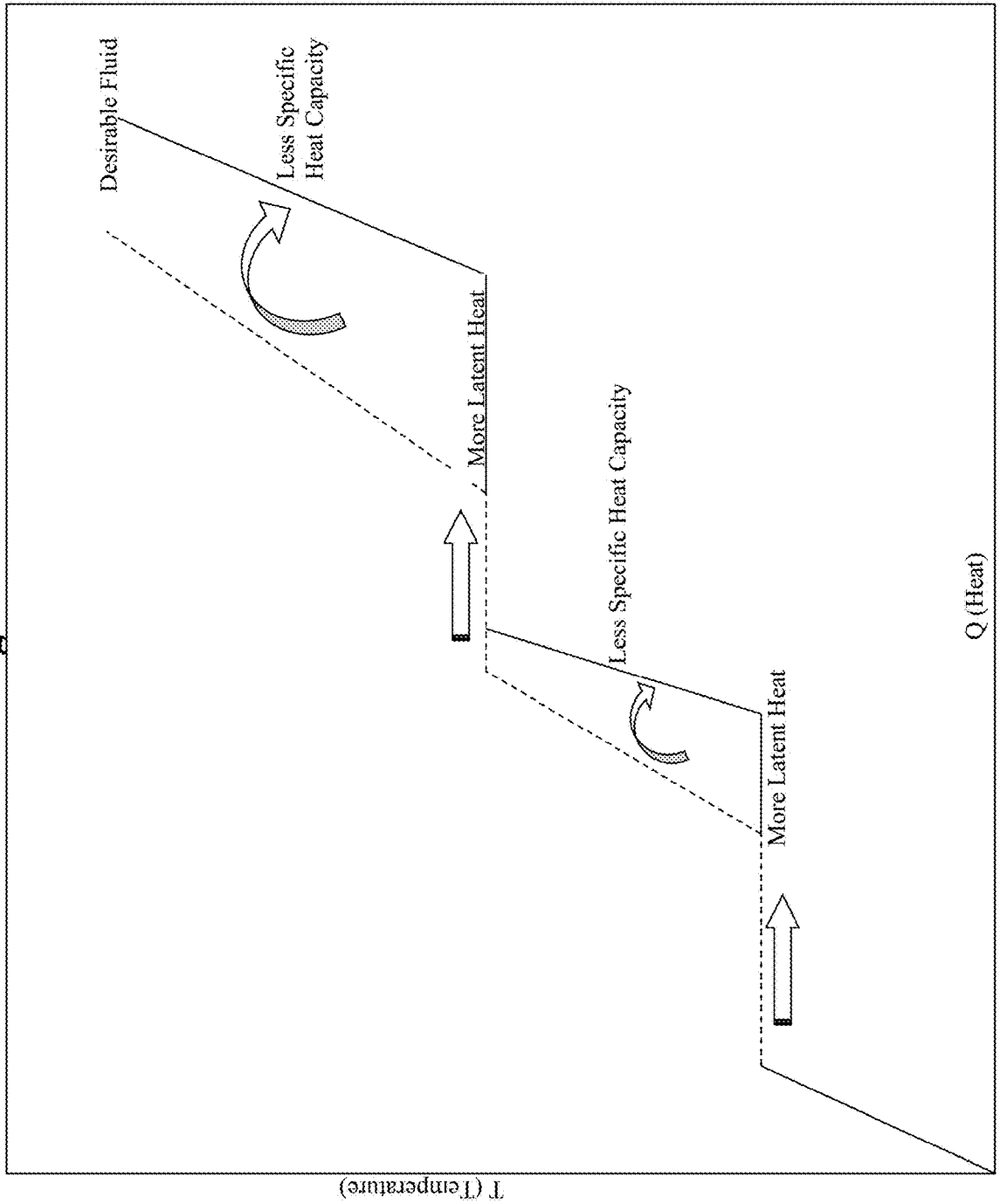
FIG. 4A is a graph showing characteristics of a desirable primary fluid for use in a binary thermal energy system for generating electricity, according to an embodiment.

FIG. 4A is a graph showing some thermodynamic characteristics of a desirable primary fluid for use in binary thermal energy system for generating electricity according to an embodiment. The graph compares the latent heat and specific heat capacity of a desirable primary fluid (solid line) with that of water (dotted line) with respect to temperature (y-axis) and heat (x-axis) during phase changes. Temperature is a direct measurement of thermal energy. That is, thermal energy is measured through temperature. Accordingly, the higher the temperature of a primary fluid, the more thermal energy the primary fluid has. Fluid selection for utilization in a thermal energy system should thus prioritize thermodynamic properties of a working fluid that carry heat with minimum loss and maximum absorption. Heat is the transfer of thermal energy between two substances (e.g., a primary fluid and a secondary working fluid) caused by a difference in temperature. In other words, heat is a measure of how much thermal energy is transferred between two substances. Thermal energy may be considered the most important factor in thermal energy system fluid selection and design. Because heat flows spontaneously from a substance with higher thermal energy to a substance with lower thermal energy, the minimum requirement for heat transfer between substances is the difference between their thermal energies.

A desirable primary fluid may be a predetermined primary fluid 1 that is selected from a set of fluids or created by combining two or more fluids. As shown in FIG. 4A, the desirable predetermined primary fluid 1 (solid line) should have a latent heat greater than a latent heat of water (dotted line) at a phase change from liquid to gas. This would enable the predetermined primary fluid 1 to have a greater amount of thermal energy to transfer as heat to the predetermined secondary working fluid 3 in the heat exchanger 2. In addition, the desirable predetermined primary fluid 1 (solid line) should have a specific heat capacity less than a specific heat capacity of water in both the liquid phase and the gas phase. This is shown in FIG. 4A by the steeper slope of the solid line representing the predetermined primary fluid 1 compared to the slope of the dotted line representing water. The slope is equal to 1/heat capacity. Thus, a smaller heat capacity results in a steeper slope, representing a higher temperature (i.e., more thermal energy). Accordingly, the desirable predetermined primary fluid 1 (solid line) should have a specific heat capacity less than a specific heat capacity of water to obtain a steeper slope in the graph of FIG. 4A.

The predetermined primary fluid 1 should rapidly increase its temperature as high as possible (i.e., have a relatively low specific heat capacity) as soon as the fluid encounters the thermal energy source, e.g., an underground formation. The predetermined primary fluid 1 should then as much as possible maintain that temperature (i.e., have a relatively high latent energy) while travelling from the thermal energy source to, e.g., the surface 14 or the heat exchanger 2, with minimum heat loss. As the predetermined primary 1 travels to the surface 14, the pressure on the fluid may decrease due to hydrostatic pressure and back pressure. In a binary system, the role of the predetermined primary fluid 1 is to transfer thermal energy from the thermal energy source to the predetermined secondary working fluid 3 in the heat exchanger 2 at the surface 14 with minimum loss. When the predetermined primary fluid 1 reaches the surface 14 or the heat exchanger 2, the predetermined primary fluid 1 should not undergo a phase change from liquid to gas, and should have about the same temperature as when it absorbed thermal energy from the thermal energy source. The predetermined primary fluid 1 in a binary system must therefore have enough latent heat capacity to overcome and offset heat loss while travelling from the thermal energy source to the surface 14 and/or heat exchanger 2. In some embodiments, the predetermined primary fluid 1 should have a latent heat that is at least greater than total heat loss from the thermal energy source to maintain at least a boiling temperature of the predetermined primary fluid 1 at the heat exchanger 2.

Figure 4B:
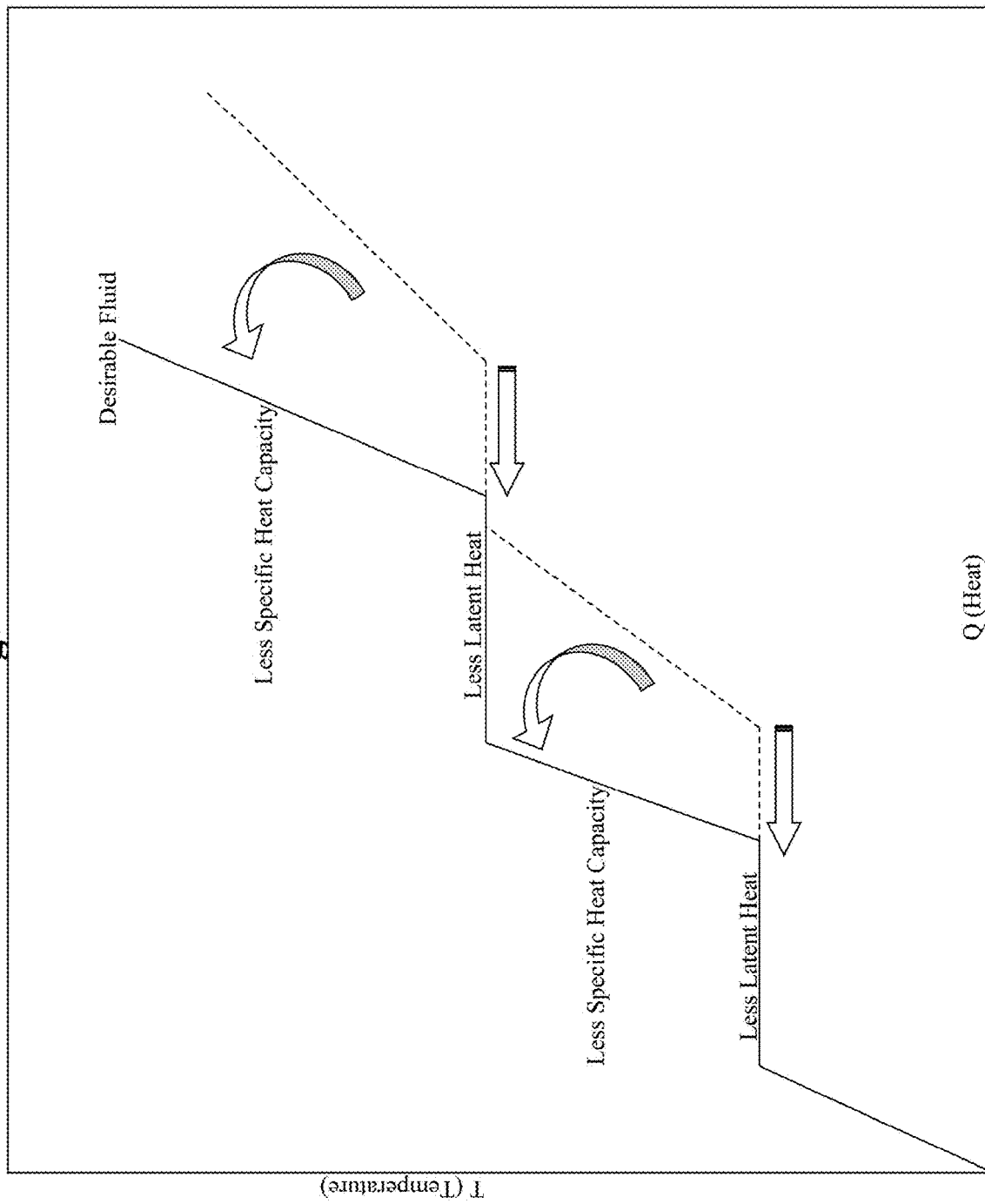
FIG. 4B is a graph showing characteristics of: (i) a desirable secondary working fluid for use in a binary thermal energy system for generating electricity; and (ii) a desirable working fluid for use in a single fluid thermal energy system for generating electricity, according to an embodiment.

FIG. 4B is a graph showing some thermodynamic characteristics of a desirable secondary working fluid for use in a binary thermal energy system for generating electricity according to an embodiment. The graph compares the latent heat and specific heat capacity of a desirable predetermined secondary working fluid 3 (solid line) with that of water (dotted line) with respect to temperature (y-axis) and heat (x-axis) during phase changes. Because the amount of heat acquired by the predetermined secondary working fluid 3 is based on how much thermal energy is transferred between the predetermined primary fluid 1 and the secondary working fluid 3, it may be important to ensure a significant thermal energy difference between the predetermined primary fluid 1 and the predetermined secondary working fluid 3 at the heat exchanger 2. In this regard, the predetermined primary fluid 1 should have a maximum amount of absorbed thermal energy compared to a relatively small amount of thermal energy in predetermined secondary working fluid 3. Accordingly, a desirable predetermined secondary working fluid 3 should have a latent heat that is less than a latent heat of water at a phase change from liquid to gas, as shown in FIG. 4B, in order to acquire a maximum amount of heat (i.e., the transfer of thermal energy) from the predetermined primary fluid 1 and more quickly change its phase from liquid to gas. The hot gas/vapor of the predetermined secondary working fluid 3 generated at the heat exchanger 2 will than have greater high kinetic energy with low entropy entering into turbine 5. The kinetic energy may then perform greater work by turning the blades and the shaft of the turbine 5 with more faster (e.g., with more force) to generate more electricity in the electricity generator 6 via electromagnetic induction as discussed above.

In addition, FIG. 4B shows that the desirable predetermined secondary working fluid 3 should have a specific heat capacity less than a specific heat capacity of water in a liquid phase and in a gas phase, in order to increase its temperature as high as possible (i.e., have a relatively low specific heat capacity) as soon as the predetermined secondary working fluid 3 encounters the thermal energy from the predetermined primary fluid 1 in the heat exchanger 2. In some cases, the predetermined secondary working fluid 3 may be heated in the heat exchanger 2 to reach a supercritical state, so that the predetermined secondary working fluid 3 may drive the turbine 5 while in the supercritical state. Note that the slope of the solid line in FIG. 4B representing the predetermined secondary working fluid 3 is steeper than the slope of the dotted line representing water.

In a single fluid geothermal system in which the predetermined primary fluid 1 is used as the working fluid to drive the turbine 5, the predetermined primary working fluid 1 should have the thermodynamic characteristics shown in FIG. 4B with the solid line. In this case, the predetermined primary working fluid 1 should have a latent heat that is less than a latent heat of water at a phase change from liquid to gas in order to more quickly change its phase to vapor/gas nearby or at the surface 14 or the turbine 5. The latent heat, however, should be sufficient for a phase change from liquid to gas with lower pressure (e.g., atmospheric) at the surface 14 or turbine 5. Expansion of predetermined primary working fluid 1 from a liquid state to a vapor/gas will increase the volume and pressure of the predetermined primary working fluid 1, and subsequently its enthalpy. In the vapor/gas state, the kinetic energy of the predetermined primary working fluid 1 will increase to provide more work to the turbine 5 to generate more electricity in the electricity generator 6 as discussed above. The entropy of the predetermined primary working fluid 1 should be at its lowest at the turbine 5 to perform a maximum amount work. FIG. 4B also shows that the desirable predetermined primary working fluid 1 in a single fluid system should have a specific heat capacity less than a specific heat capacity of water in a liquid phase and in a gas phase, in order to increase its temperature as high as possible (i.e., have a relatively low specific heat capacity) as soon as the predetermined primary working fluid 1 encounters thermal energy from the thermal energy source. In some cases, the predetermined primary working fluid 1 may be heated to reach a supercritical state, so that the predetermined primary working fluid 1 may drive the turbine 5 while in the supercritical state. Note that the slope of the solid line in FIG. 4B representing the predetermined primary working fluid 1 is steeper than the slope of the dotted line representing water.

Figure 4C:
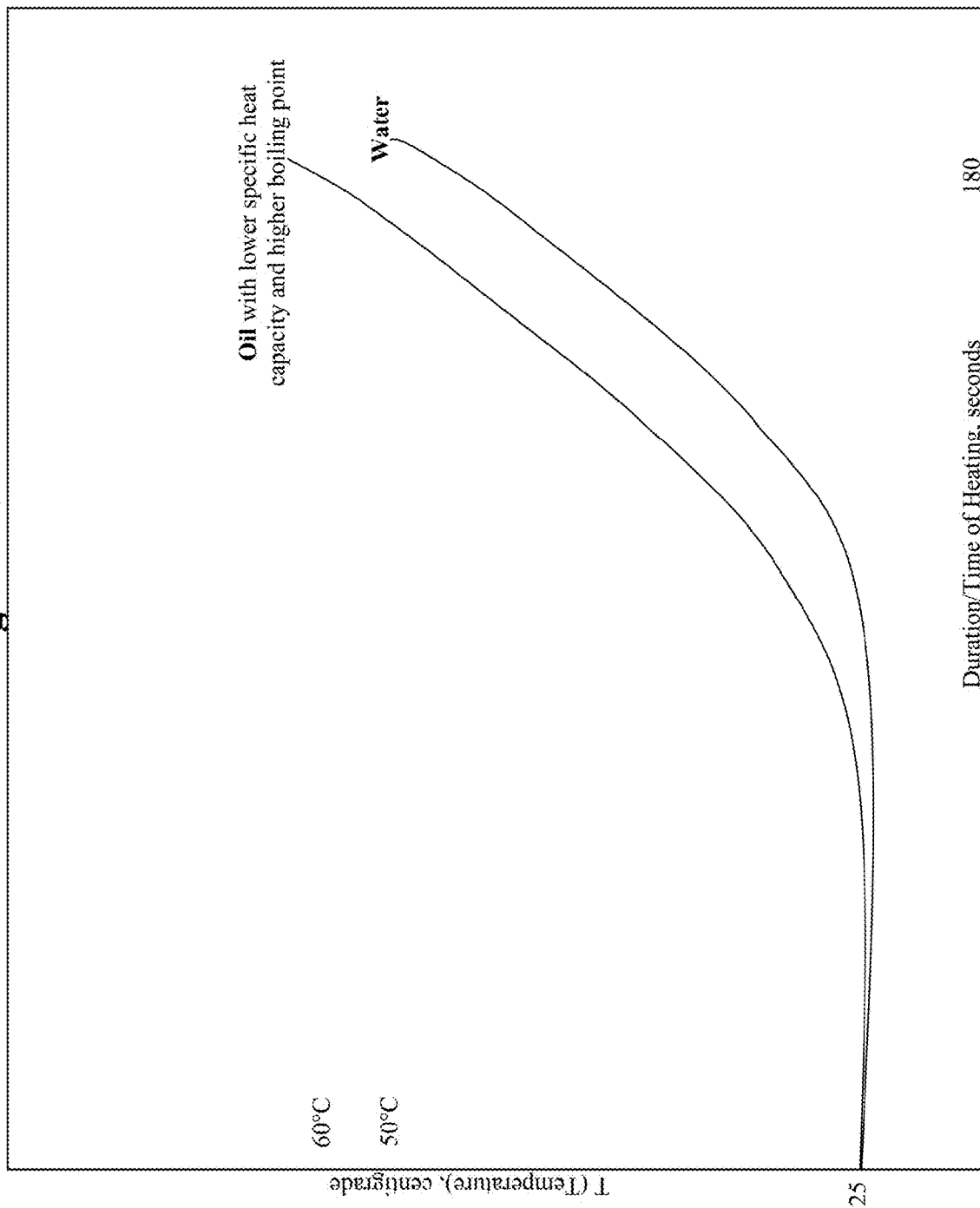
FIG. 4C is a graph comparing oil and water as working primary fluids with respect to temperature over time, according to an embodiment.

FIG. 4C is a graph comparing oil and water as working fluids with respect to temperature over time, according to an embodiment. In the graph, both the oil and water at temperature of 25 degrees Celsius are heated for 180 seconds. The graph shows that oil, with a specific heat capacity less than that of water and a higher boiling point, reaches a temperature of 60 degrees Celsius after being heated for 180 seconds. On the other hand, water (with a higher heat capacity than oil and lower boiling point) only reaches a temperature of 50 degrees Celsius after being heated for 180 seconds. Thus, potential working fluids having a specific heat capacity less than that of water and a higher boiling point than water are able to reach higher temperatures faster than water, and are thus more efficient in thermal energy systems that generate electricity.

As another example, the following table shows that less energy is required to bring one mole of acetone to the same temperature (e.g., 110° C.) of water.

TABLE 2

Acetone vs. Water

| Fluid | Boiling Point ° C. | Required Energy (Kj/Kg) | Required Energy (Kj/Kmol) |
|---|---|---|---|
| Water ($H_2O$) | 56.05 | 700 | 40,644 |
| Acetone ($CH_3COCH_3$) | 100 | 2,620 | 47,152 |

Water temperate at 110° C. is close to its boiling point (100° C.), whereas Acetone ($CH_3COCH_3$) is quite far (56.05° C.) from that temperature. This means when steam is passing through a turbine, a significant amount of energy is expended during the phase change from liquid to gas (steam), whereas acetone would still be in the gaseous phase. Accordingly, the kinetic energy of the two phase flow of water is much lower than the single gaseous phase of acetone. Thus, less work is able to be performed by two phase water than single gaseous phase acetone. In addition, the two phase flow of liquid droplets and steam impacting the turbine blades with high speed can erode and damage the turbine blades over time. Because acetone remains in the gaseous single phase, all of the kinetic energy can be used to generate work without damaging the turbine blades.

FIG. 4D shows phase/state diagrams for fluids, according to an embodiment. The two dimensional diagram on the left shows the phase changes of a given fluid as pressure (y-axis) and temperature (x-axis) increase. As pressure (y-axis) and temperature (x-axis) increase, the substance may change its phase from a solid ("solid phase") to a liquid ("liquid phase"), and from a liquid to a gas ("gaseous phase"). As discussed above, upon reaching a critical pressure and a critical temperature (the "critical point"), the substance may change from a gas phase to a supercritical phase. Thus, the predetermined secondary working fluid 3 becomes supercritical when the pressure and temperature of the predetermined secondary working fluid 3 reaches the critical point. In a "single fluid" thermal energy systems, the predetermined primary working fluid 1 becomes supercritical when the pressure and temperature of the predetermined primary working fluid 1 reaches the critical point. In the "binary" thermal energy systems discussed herein, the predetermined secondary working fluid 3 is preferably in the supercritical phase when driving the turbine 5. However, the predetermined secondary working fluid 3 may also be in the gaseous phase when driving the turbine 5. In the "single fluid" thermal energy systems discussed herein, the predetermined primary working fluid 1 is preferably in the supercritical phase when driving the turbine 5. However, the predetermined primary working fluid 1 may also be in the gaseous phase when driving the turbine 5. The three dimensional diagram on the right in FIG. 4D shows the phase changes of a given working fluid with respect to pressure (y-axis), temperature (x-axis) and specific volume (z-axis). The latent heat for phase change is apparent along the z-axis.

Table 3 shows that with a constant thermal energy source, acetone can reach a supercritical condition (918° C.), whereas water is still at gaseous phase (110° C.) nearby its boiling point.

TABLE 3

Acetone vs. Water

| Fluid | Supercritical Temperature ° C. | Required Energy (Kj/Kg) | Required Energy (Kj/Kmol) |
|---|---|---|---|
| Water ($H_2O$) | 918 | 2,620 | 47,152 |
| Acetone ($CH_3COCH_3$) | 110 | 2,620 | 47,152 |

(Kinetic Energy$_{Acetone}$/(Kinetic Energy$_{Water}$) = 3.3

The velocity and kinetic energy of acetone is more than three times more than that of water, such that three times more pressure than steam will enter into the turbine 5. The work done by acetone in the turbine 5 will thus be significantly higher than the work that can be done by water. More work can turn the shaft of the turbine 5 faster to generate more electricity 7 via the electricity generator 6.

An experiment conducted by the inventor at room temperature utilized a mixture of chlorine (having a boiling point of −34.04° C.) and acetone (having a boiling point of 56° C.) as a working fluid. The chlorine/acetone mixture was provided in a pressure cooker that was heated on a stove using a flame of the stove as the thermal energy source. The chlorine/acetone mixture reached a boiling temperature of 43.9° C. via absorption of the thermal energy from the flame, and was also in a supercritical state. When the gas/vapor of the chlorine/acetone mixture exited the nozzle of the pressure cooker under these conditions, the gas/vapor was sufficient to turn the shaft of a small turbine and drive an electricity generator connected to the shaft to generate electricity.

FIG. 5 is an example of the value matrix for selection or design of a fluid (e.g., the predetermined primary fluid 1, the predetermined primary working fluid 1, and/or the predetermined primary working fluid 3) to be utilized in thermal energy systems for generating electricity, according to an embodiment. The value matrix may be represented by a table that compares the values of several criteria for different candidates of fluids in columns and rows as shown in FIG. 5. The criteria may include the physical and chemical properties of the candidate fluids, Health, Safety and Environmental (HSE) properties of the candidate fluids, and a monetary cost of the candidate fluids. The physical and chemical properties may include one or more of: boiling point, specific heat capacity, latent energy, phase status, specific enthalpy, specific entropy, supercriticality, flash point, specific heat storage capacity, and thermal conductivity. The Health, Safety and Environmental (HSE) properties may include one or more of: flammability, harmfulness to humans, environmental friendliness, corrosiveness, and erosiveness.

Some examples of fluids that may be candidate fluids for use in the thermal energy systems and processes discussed herein include, but are not limited to: alcohols such as ethanol and methanol; acetone, propanone, ketones; amines; ethylamine (also known as Ethanamine $CH_3CH_2NH_2$); refrigerants; Freon®; 1,1,1,2-Tetrafluorocthane (also known as norflurane (INN), R-134a, Freon 134a, Forane 134a, Genetron 134a, Green Gas; Florasol 134a, Suva 134a, or HFC-134a); Chlorofluorocarbons (CFCs) and hydrochlorofluorocarbons (HCFCs); and Trichlorofluoromethane (also called freon-11, CFC-11, or R-11). Freon® is a stable, nonflammable, low toxicity gas or liquid which has generally been used as a refrigerant and as an aerosol propellant. Not all refrigerants of this type are labelled as "Freon" since Freon® is a brand name for the refrigerants R-12, R-13B1, R-22, R-410A, R-502, and R-503 manufactured by The Chemours Company. The term "freon" is also a generic descriptor of a fluorocarbon refrigerant. 1,1,1,2-Tetrafluoroethane ($CF_3CH_2F$) is a hydrofluorocarbon (HFC) and haloalkane refrigerant with thermodynamic properties similar to R-12 (dichlorodifluoromethane). It has a boiling point of −26.3° C. (−15.34° F.) at atmospheric pressure. Chlorofluorocarbons (CFCs) and hydrochlorofluorocarbons (HCFCs) are fully or partly halogenated paraffin hydrocarbons that contain only carbon (C), hydrogen (H), chlorine (Cl), and fluorine (F), produced as volatile derivatives of methane, ethane, and propane. Trichlorofluoromethane is a colorless liquid that boils around room temperature.

In selecting or designing an optimal fluid (e.g., the predetermined primary working fluid 1 and/or the predetermined primary working fluid 3) using the value matrix, a first step may be to identify candidate fluids and list each one in a column of the table. Next, a value for each of the criteria is assigned to each one of the candidate fluids. For instance, a first candidate fluid with a lower boiling point than a second candidate fluid may be given a higher value (score) than the second candidate fluid. The value may be an alphanumeric value, for example a number from "1" to "10" wherein a value of "1" is the lowest value and a value of "10" is the highest value. Thus, the first candidate fluid may be assigned a value of "8" for the boiling point criteria while the second candidate fluid may be assigned a value of "3" for the boiling point criteria. The process may be repeated for each criteria in the value matrix. Some of the criteria may be more important than other criteria by having a greater impact on thermodynamic performance of the candidate fluids. In this regard, the criteria may be classified into categories of importance, such as (in order of importance): "Critical", "High", "Medium", and "Low". In such a case, the criteria having a greater impact on thermodynamic performance may be assigned additional weight to the already assigned value. That is, the assigned value may be weighted by the relative importance of the criteria. The additional weight may be a multiplier that multiples the assigned value by a predetermined factor, such as a factor of 1.5. In this regard, the value of "8" already assigned to the boiling point criteria of a first candidate fluid may be increased to a value of "12" by the 1.5 multiplier if the boiling point criteria is afforded additional weight because of its relative importance. In an alternative embodiment, the additional weight may be an addition of a further value, such as by adding an additional "1" or "2" to the already assigned value. For instance, the value of "8" already assigned to the boiling point criteria of a first candidate fluid may be increased to a value of "9" or "10" if the boiling point criteria is afforded additional weight because of its relative importance. After values are assigned and (optionally) weighted for each candidate fluid, a sum total of all values for the criteria may be calculated for each candidate fluid. The candidate fluids may then be assigned a rank based on the compared sum total values for all of the candidate fluids. The candidate fluid with the highest rank (i.e., the largest sum total of values) may be considered as the best candidate or first choice for use in a geothermal system because that candidate fluid has the highest score of values for the listed criteria compared to the other candidate fluids. The candidate fluid with the largest sum total of values in the value matrix may thus be selected as the predetermined primary fluid 1, the predetermined primary working fluid 1, and/or the predetermined primary working fluid 3, for the thermal energy systems discussed herein.

In an embodiment, the boiling point, the specific heat capacity, and the latent energy may have relatively more important (e.g., "Critical") thermodynamic properties than the phase status, the specific enthalpy, the specific entropy, the supercriticality (e.g., "High"), the flash point, the specific heat storage capacity (e.g., "Medium"), and the thermal conductivity (e.g., "Low"). Thus, the values assigned to the boiling point, the specific heat capacity, and the latent energy (e.g., "Critical") may have greater weight (e.g., may be weighted as discussed above) than the values assigned to the phase status, the specific enthalpy, the specific entropy, the supercriticality (e.g., "High"), the flash point, the specific heat storage capacity (e.g., "Medium"), and the thermal conductivity (e.g., "Low"). In addition, the values assigned to the phase status, the specific enthalpy, the specific entropy, and the supercriticality (e.g., "High") may have greater weight (e.g., may be weighted as discussed above) than the values assigned to the flash point, the specific heat storage capacity (e.g., "Medium"), and the thermal conductivity (e.g., "Low"). Moreover, the values assigned to the flash point and the specific heat storage capacity (e.g., "Medium") may have greater weight (e.g., may be weighted as discussed above) than the value assigned to the thermal conductivity (e.g., "Low"). Thus, different sets of criteria may be afforded different weights in the manner discussed above, and some criteria may not be weighted. That is, there may be a hierarchy of weighted criteria, with some criteria being weighted more than others.

With respect to the Health, Safety and Environmental (HSE) properties the flammability may be relatively more important (e.g., "Critical") than the harmfulness to humans, the environmental friendliness (e.g., "High"), the corrosiveness, and the erosiveness (e.g., "Medium"). In such a case, the value assigned to the flammability criteria may have greater weight (e.g., may be weighted as discussed above) than the values assigned to the harmfulness to humans, the environmental friendliness, the corrosiveness, and the erosiveness. In addition, the values assigned to the harmfulness to humans and the environmental friendliness (e.g., "High") may have a greater weight (e.g., may be weighted as discussed above) than the values assigned to the corrosiveness and the erosiveness (e.g., "Medium"). Thus, different sets of the Health, Safety and Environmental (HSE) criteria may be afforded different weights in the manner discussed above, and some criteria may not be weighted.

The physical, chemical, Health, Safety and Environmental (HSE), and cost criteria and their pertinence to the thermal energy systems discussed herein are as follows.

Boiling Point

The boiling point of a fluid is the temperature at which the vapor pressure of the fluid (e.g., liquid) equals the pressure surrounding the fluid and the fluid (e.g., liquid) changes into a vapor/gas. The boiling point of a fluid (e.g., liquid) varies depending upon the surrounding environmental pressure. Liquids may change to a vapor at temperatures below their boiling points through the process of evaporation. Evaporation is a surface phenomenon in which molecules located nearby the liquid's edge, not contained by enough liquid pressure on that side, escape into the surroundings as vapor. On the other hand, boiling is a process in which molecules anywhere in the liquid escape, resulting in the formation of vapor bubbles within the liquid. The heat of vaporization is the energy required to transform a given quantity (a mol, kg, pound, etc.) of a substance from a liquid into a gas at a given pressure (often atmospheric pressure). Vaporization is the process in which a liquid is converted to a gas.

Boiling point may be considered one of the most important factors in thermal energy fluid design and selection. In a "single fluid" thermal energy system, the predetermined primary working fluid 1 preferably changes its phase when traveling from the thermal energy source (e.g., an underground formation) to the surface 14 and entering the turbine 5. In this case, the predetermined primary working fluid 1 is in a liquid state when encountering the thermal energy source. In the liquid state, molecules are closer to each other and thus absorb more heat. Maximum heat transfer should occur at this stage. The predetermined primary working fluid 1 is preferably at its boiling temperature with a relatively small latent heat capacity (see FIG. 4B). At the thermal energy source, a phase change has not yet occurred. As predetermined primary working fluid 1 travels toward the surface 14 or turbine 5, the pressure of system may decreases due to less hydrostatic pressure (System Pressure=density of fluid×gravity×depth+backpressure). Less system pressure close to surface 14 or turbine may cause a lower boiling point of the predetermined primary working fluid 1. The latent heat within the predetermined primary working fluid 1 should be sufficient, however, to compensate for any heat loss while travelling toward the surface 14 or turbine 5, as well as the phase change of the predetermined primary working fluid 1 to the vapor/gas at or nearby the surface 14 prior to entering the turbine 5.

In a "binary" thermal energy system, the predetermined secondary working fluid 3 should have low specific heat capacity to change its temperature quickly as discussed above (see FIG. 4B). In an embodiment, the boiling point of the predetermined primary fluid 1 may be lower than a temperature of the thermal energy source, and the predetermined secondary working fluid 3 may have a lower boiling point than a temperature of the predetermined primary fluid 1 at the heat exchanger 2. This means that the predetermined secondary working fluid 3 has a lower thermal energy and enthalpy than the predetermined primary working fluid 1 at the heat exchanger 2. Accordingly, the latent heat from the predetermined primary fluid 1 will be transferred to the predetermined secondary working fluid 3. The latent heat of the predetermined secondary working fluid 3 should be small enough so that the absorbed heat changes the phase of the predetermined secondary working fluid 3 quickly from a liquid state to a vapor/gas state (see FIG. 4B).

Flash Point

The flash point of a volatile material is the lowest temperature at which its vapors ignite if given an ignition source. As temperature increases, vapor pressure increases. As vapor pressure increases, the concentration of vapor of a flammable or combustible fluid in the air increases. Hence, temperature can determine the concentration of vapor of the flammable fluid in the air. A certain concentration of a flammable or combustible vapor is necessary to sustain combustion in air. The flash point is the lowest temperature at which there will be enough flammable vapor to induce ignition when an ignition source is applied. Preferably, a working fluid needs to have a high flash point that makes it less flammable and combustible. Even though the thermal energy system may be a closed loop, there may still be potential for ignition. Working fluid flash point requires a high number to keep the system safe. Compliance with Occupational Safety and Health Administration (OSHA) guidelines for safety should be considered when selecting or designing a working fluid candidate.

Specific Heat Capacity

The specific heat capacity of a substance is the amount of energy required to raise the temperature of one unit of mass (kilogram) of that substance by one degree Kelvin (Celsius or Fahrenheit). As an example, if one unit of mass of oil and water is heated separately, oil will get hotter after specific period of time because the specific heat capacity of oil is much less than water as discussed with respect to FIG. 4C. In FIGS. 4A and 4B, the slope of the lines represents the inverse of specific heat capacity:

Slope of Lines=1/(Specific Heat Capacity)

As discussed above, the predetermined primary fluid 1, the predetermined primary working fluid 1, and predetermined secondary working fluid 3, should have a relatively high slope and low specific heat capacity as compared with, for example, water (see FIGS. 4A and 4B). This is true for both "single fluid" and "binary" thermal energy systems. In such cases, as soon as heat transfers from a higher thermal energy substance to a lower thermal energy fluid, the temperature of the fluid with lower thermal energy increases significantly.

Specific Heat Energy Storage

Specific heat energy storage allows excess thermal energy to be stored for a longer time period. Some fluids may have a greater capacity for specific thermal energy storage than others. Materials such as salt and other solid particles, nanoparticles, and organic or nonorganic materials with a high storage capacity of thermal energy can be mixed with the predetermined primary working fluid 1 in a "binary system" thermal energy system to provide the predetermined primary working fluid 1 with a greater capacity for specific thermal energy storage. Adding such solids to a secondary fluid in a "binary system" thermal energy system, or to a primary fluid 1 in a "single fluid" thermal energy system, should be avoided, as the solids can erode the turbine blades over time. Thus, mixing such solid materials is preferable with the predetermined primary working fluid 1 in a "binary system" thermal energy system to help store thermal energy from the thermal energy source as the fluid travels to the surface 14 or turbine 5.

Latent Heat

As discussed above, the latent heat of a substance is the heat required for the substance to change its phase/state. During these phase transitions, heat can be added or extracted without affecting the substance's temperature. At a constant temperature, the substance absorbs latent heat to change its sate. This plays a crucial role in thermal heat transfer from the thermal energy source to the turbine 5 and from the predetermined primary working fluid 1 to the predetermined secondary working fluid 3. As discussed above with respect to FIG. 4B, the predetermined primary fluid 1 in a "single fluid" thermal energy system or the predetermined secondary working fluid 3 in a "binary" thermal energy system should have a relatively smaller latent heat to change its state from liquid to vapor/gas prior to entering the turbine 5. In the "binary" thermal energy system, the predetermined primary working fluid 1 should have a relatively larger latent heat to maintain the temperature from the thermal energy source to the surface 14, and eventually to the heat exchanger 2.

Thermal Conductivity

Thermal conductivity is a measure of the ability of a substance to transfer heat. Heat transfer occurs at a lower rate in a substance having low thermal conductivity than in a substance having high thermal conductivity. When a fluid encounters thermal energy, its thermal conductivity should be high enough to transfer heat evenly and homogenously through itself. If the fluid has low thermal conductivity, heat will not distribute equally and consistently through it. This can adversely impact a thermal energy system's ability to consistently generate electricity.

Phase Status

A substance exists in one of four states or phases: a solid; a liquid, a gas (or vapor), and plasma. As a rule of thumb, a gaseous or vaporous state is desirable for a working fluid encountering turbine blades. Generally, a fluid in the gaseous or vaporous phase may have higher kinetic energy than if in another phase, which is important for turning the turbine blades faster and thus generating more electricity via an electricity generator as discussed herein. As a working fluid leaves the turbine, it should return to a liquid phase which possesses more density and heat absorption. For instance, when the predetermined secondary working fluid 3 enters the heat exchanger 2, it should preferably be in a liquid state to absorb more thermal energy from the predetermined primary fluid 1. When the predetermined secondary working fluid 3 leaves the heat exchanger 2, it should preferably be in gaseous/vaporous state to have more kinetic energy for driving the turbine 5. At the same time, a liquid state is desirable for the predetermined primary fluid 1 carrying heat from the thermal energy source to the predetermined secondary working fluid 3. The predetermined primary fluid 1 preferably does not change its phase from liquid to gas when is traveling from the thermal energy source because liquid will bring more heat to, e.g., the surface 14 per unit of mass. Having a high temperature does not mean that the predetermined primary fluid 1 should be in gaseous sate. The predetermined primary fluid 1 can be in a transition state (i.e., latent heat) so that the temperature can be constant.

Specific Enthalpy

Enthalpy (H) is a property of a thermodynamic system, and is defined as the sum of the system's internal energy (U) and the work required to achieve its pressure (P) and volume (V):

$$H = U + PV$$

As a state function, enthalpy depends only on the final configuration of internal energy, pressure, and volume, rather than on the path taken to achieve it. When a predetermined primary fluid 1 encounters a source of thermal energy, heat transfer causes enthalpy of the predetermined primary fluid 1 to increase. Accordingly, when the predetermined primary fluid 1 reaches the surface 14 or turbine 5, its enthalpy changes. This is due to a change in pressure, as well as expansion. By the time the predetermined primary fluid 1 enters the heat exchanger 2 (in a "binary" thermal energy system) or the turbine 5 ("single fluid" thermal energy system), enthalpy of the predetermined primary fluid 1 will decrease due to reduction in its energy level. In a "binary" thermal energy system, the predetermined secondary working fluid 3 will absorb the heat and increase its enthalpy. When the predetermined secondary working fluid 3 passes through the turbine 5, this enthalpy will create work. Both pressure and volume of the predetermined secondary working fluid 3 will change. Pressure will decrease and volume will increase. By the time the predetermined secondary working fluid 3 leaves the turbine 5, its enthalpy will decrease.

Specific Entropy

Entropy is a measure of how organized or disorganized energy is in a system of atoms or molecules. In this regard, the entropy of a working fluid is a measure of the amount of energy per unit temperature which is unavailable to do work. As entropy increases, the quality of energy decreases. A working fluid should thus have low entropy.

Wettability

Wettability is the measurement of a liquid's ability to interact with other fluids and/or a solid surface (e.g., formation rock). Wettability measures the level of wetting when solid and liquid phases interact with each other. When a liquid is in contact with a solid surface, it should maintain its balance between the intermolecular interactions of an adhesive type (e.g., liquid to pores of a formation rock/solid) and a cohesive type (e.g., liquid to liquid). In an open loop geothermal system, when the geothermal fluid is in direct contact with the underground formation, it should not change the wettability of the rock.

Viscosity and Mobility

The viscosity of a fluid is a measure of its resistance to mobilization and deformation at a given rate. Viscosity can be conceptualized as quantifying the internal frictional force that arises between adjacent layers of fluid that are in relative motion. The mobility of a fluid though a porous and permeable rock is defined as relative permeability of rock divided by viscosity of fluid. Mobility combines a rock property, i.e., permeability, with a fluid property, i.e., viscosity.

$$\text{Mobility of Fluid within Formation} = \text{Relative Permeability of Formation/Viscosity of Fluid}$$

In an open loop geothermal process, the predetermined primary fluid 1 may travel through open holes in the formation rock. Accordingly, in order to have a smooth mobility through the permeable rock, viscosity of the predetermined primary fluid 1 should be low. Otherwise, a significant amount of pump pressure is required to mobilize the viscos fluid within permeable zone of rock.

Corrosiveness

Corrosion is a chemical and/or electrochemical reaction causing destruction of materials. A suitable fluid for a thermal energy system should not be corrosive to the underground formation, wellbore, all the downhole and surface equipment, and/or components of the thermal energy system discussed herein.

Erosiveness

Erosion is a mechanical process causing surface removal of the materials. The degree if erosion may depend on the solid concentration within the fluid, angle of contact, and the fluid's velocity. A suitable fluid for a thermal energy system should not create erosion in the underground formation, wellbore, downhole tools, surface equipment, and/or components of the thermal energy system discussed herein.

Harmfulness to Humans

Harmfulness to humans causes harm or injury to a human body. A suitable fluid for a thermal energy system should not be or contain elements that are harmful to the human body. For example, a fluid may be considered harmful to humans if the human body is damaged or otherwise adversely affected by exposure or contact with the fluid or by fumes from the fluid.

Environmentally Friendliness

An environmentally friendly material is one that is eco-friendly. A suitable fluid for a thermal energy system should be eco-friendly, such that if the environment is exposed to the fluid either underground or on the surface, the environment is not damaged or harmed.

Cost Effective

A suitable fluid for a thermal energy system should not be overly expensive. A desirable fluid may have a reasonable price suitable to the conditions of a well, a well site, and/or components of the thermal energy systems discussed herein.

Organic, Nonorganic and Eutectic

A suitable fluid for a thermal energy system and any additive particles can be organic, inorganic and/or eutectic. Inorganic materials may be less flammable, less expensive, and more widely available. They may also have higher thermal storage capacity and thermal conductivity. Organic materials, on the other hand, are less corrosive and not as easy to phase-separate. Because eutectic materials are mixtures, they are more easily adjusted to obtain specific properties. However, eutectic materials may have low latent and specific heat capacities.

Figure 6A:
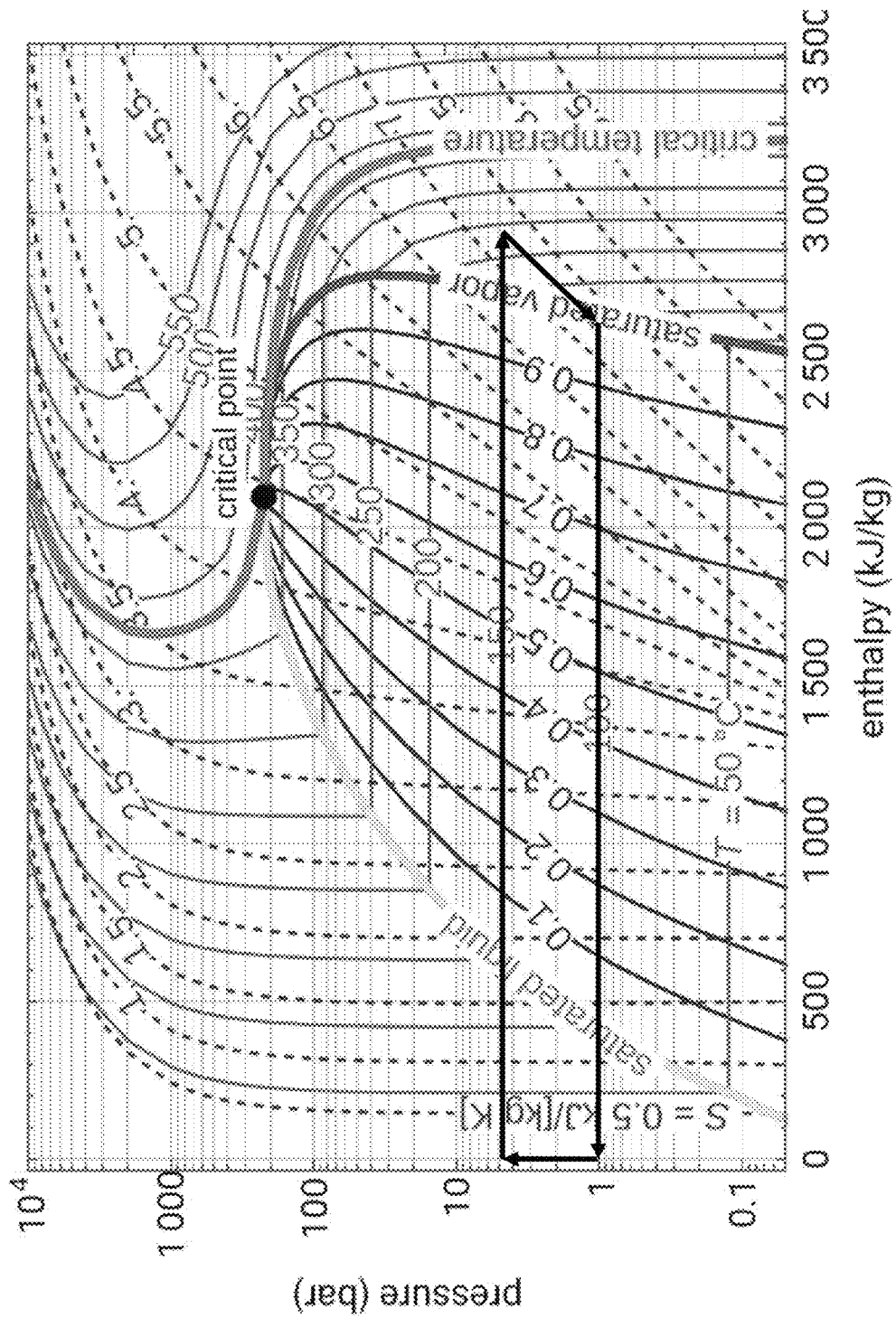
FIG. 6A illustrates a graph of a Rankine Cycle for water showing thermodynamic properties of water where the thermal energy source is exhaust flue gas.

FIG. 6A illustrates a graph of a Rankine Cycle showing thermodynamic properties of water as a working fluid where the thermal energy source is exhaust flue gas. The graph shows the critical point for water at the intersection of its saturated liquid curve, saturated vapor curve, and critical temperature curve, with respect to pressure (y-axis) and enthalpy (x-axis).

Figure 6B:
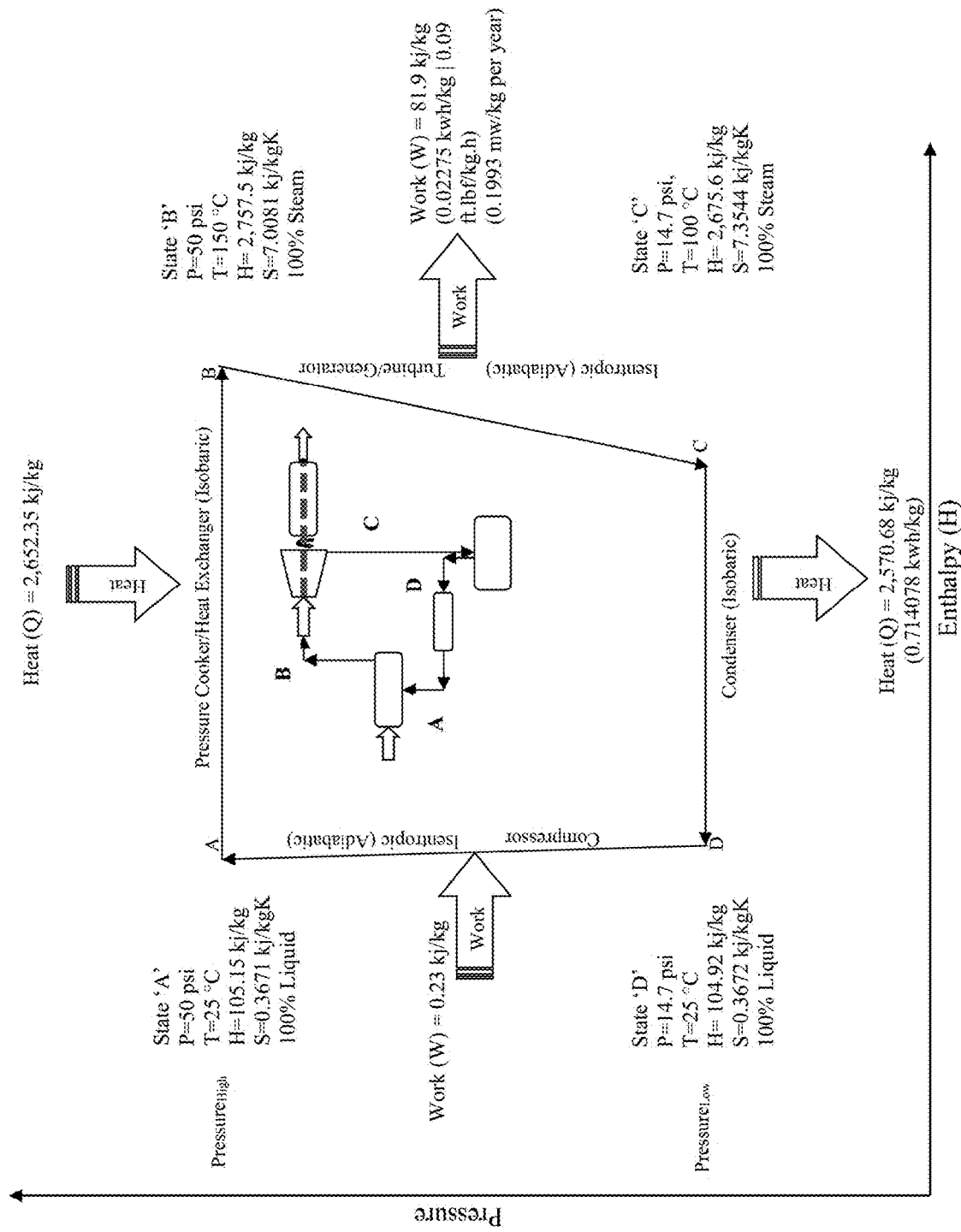
FIG. 6B illustrates a comparative example of a Rankine Cycle that is implemented by a thermal energy system in which water is used as the working fluid and the thermal energy source is exhaust flue gas of a drilling rig diesel engine.

FIG. 6B illustrates a comparative example of a Rankine Cycle that is implemented by a thermal energy system in which water is used as the working fluid, and the thermal energy source is exhaust flue gas of a drilling rig diesel engine. In general, temperatures of 500-700° C. (932-1293° F.) are produced in the exhaust gases from diesel-cycle engines at 100% load to 200-300° C. (392-572° F.) with no load. In this embodiment, the exhaust temperature is about 300° C. to 700° C. and the water enters the heat exchanger relatively quickly to absorb heat. Thus, the temperature of the water will rise to just 150° C. In a Rankine Cycle, the thermodynamic process flows as follows: Heat Exchanger (Isobaric) to Turbine (Adiabatic) to Condenser (Isobaric) to Compressor (Adiabatic). At state "A" in FIG. 6B, the water is under a pressure (P) of 50 psi, has a temperature (T) of 25° Celsius, has an enthalpy (H) of 105.15 kj/kg, has an entropy (S) of 0.3671 kj/kgK, and is in a 100 percent liquid state. In the heat exchanger, the temperature (T) is raised to 150° Celsius by the heat (Q) of 2,652.35 kj/kg from the diesel engine exhaust, the enthalpy (H) is raised to 2,757.5 kj/kg, the entropy(S) is raised to 7.0081 kj/kgK, and the state of the water is changed to gas/vapor state (e.g., 100 percent steam). The heated water enters a turbine in this state (state "B") to drive the turbine and perform work at 81.9 kj/kg. The work may drive an electricity generator to generate electricity via electromagnetic induction to produce electricity in the amount of 0.02275 kwh/kg, i.e., 0.1993 mw/kg per year. After passing through the turbine, the pressure (P) of the water is decreased to 14.7 psi, the temperature (T) is decreased to 100° Celsius, the enthalpy (H) is decreased to 2,675.6 kj/kg, the entropy(S) is raised to 7.3544 kj/kgK, and the water is maintained in the gas/vapor state (e.g., 100 percent steam) as indicated in state "C". The water may then pass through a condenser, which decreases the temperature (T) of the water to 25° Celsius, the enthalpy (H) of the water to 104.92 kj/kg, and the entropy(S) of the water to 0.3672 kj/kgK (see step "D"). The water may then pass through a compressor to elevate the pressure (P) of the water to 50 psi and may change to the state of the water to a complete liquid state, when returning to state "A" to repeat the cycle. Accordingly, water as the working fluid in this scenario produces work at 81.9 kj/kg, which may generate 0.02275 kwh/kg of electricity, i.e., 0.1993 mw/kg of electricity per year.

Figure 6C:
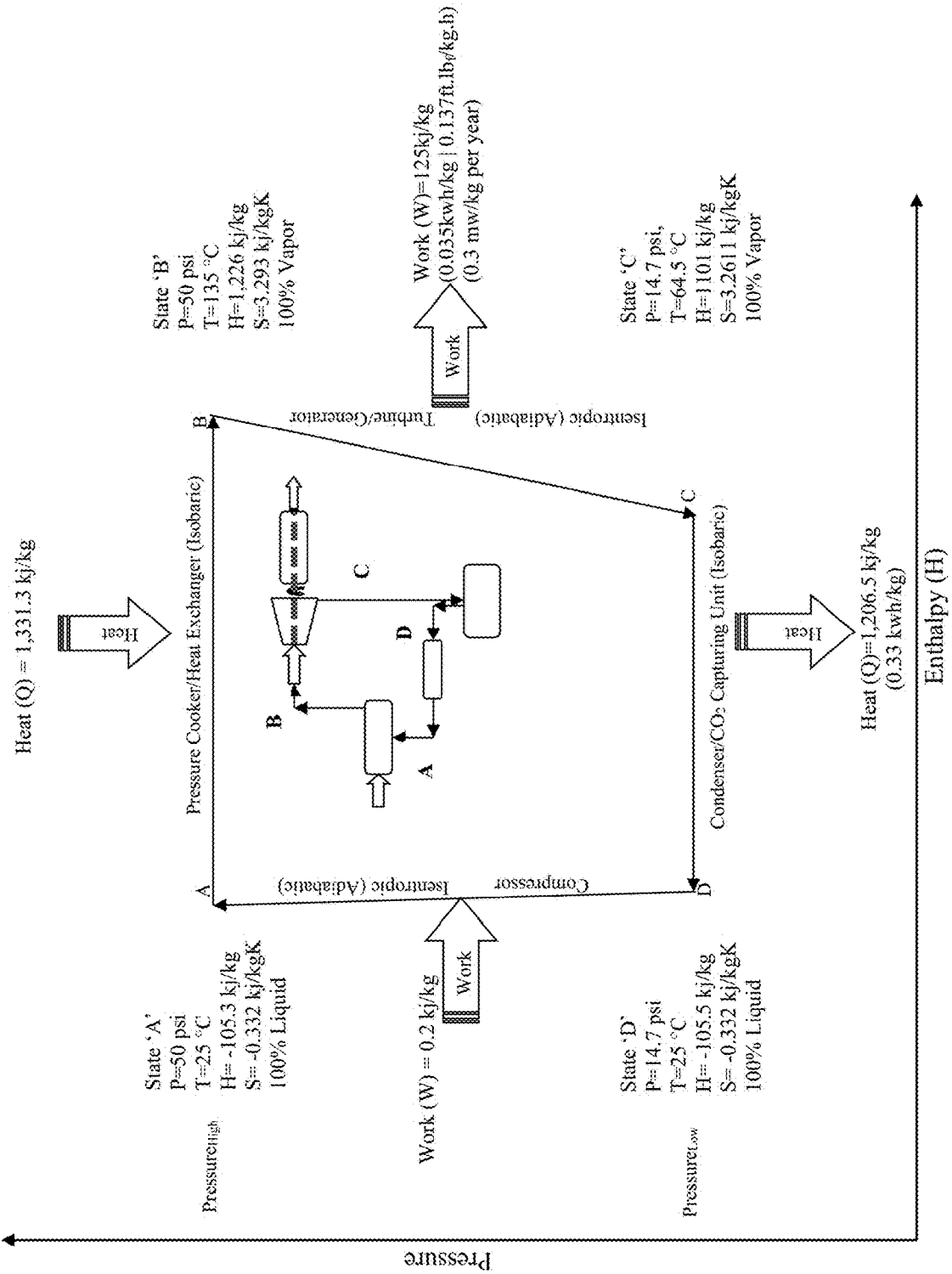
FIG. 6C illustrates an example of a Rankine Cycle that is implemented by a thermal energy system in which Methanol is used as the working fluid and the thermal energy source is exhaust flue gas of a drilling rig diesel engine.

FIG. 6C illustrates an example of a Rankine Cycle that is implemented by a thermal energy system in which Methanol is used as the working fluid with all of the other conditions of the comparative example in FIG. 6B remaining the same. As in FIG. 6B, the thermal energy source is exhaust flue gas of a drilling rig diesel engine. In this embodiment, the Methanol (working fluid) enters the heat exchanger relatively quickly to absorb heat, and so the temperature of the Methanol will rise to 135° C. (Note: $T_{Critical}$=240° C. and $P_{Critical}$=890 psi). Methanol's boiling point is 78.23° C. at atmospheric pressure. At state "A" in FIG. 6C, the Methanol (heated working fluid) is under a pressure (P) of 50 psi, has a temperature (T) of 25° Celsius, has an enthalpy (H) of −105.3 kj/kg, has an entropy(S) of −0.332 kj/kgK, and is in a 100 percent liquid state. In the heat exchanger 2, the temperature (T) is raised to 135° Celsius by the heat (Q) of 1,331.3 kj/kg from the diesel engine exhaust, the enthalpy (H) is raised to 1,226 kj/kg, the entropy(S) is raised to 3.293 kj/kgK, and the state of the Methanol is changed to gas/vapor state (e.g., 100 percent vapor). The heated Methanol enters a turbine 5 in this state (state "B") to drive the turbine 5 and perform work at 125 kj/kg. The work may drive an electricity generator to generate electricity via electromagnetic induction to produce electricity in the amount of 0.035 kwh/kg, i.e., 0.3 mw/kg per year. After passing through the turbine 5, the pressure (P) of the Methanol is decreased to 14.7 psi, the temperature (T) is decreased to 64.5° Celsius, the enthalpy (H) is decreased to 1101 kj/kg, the entropy(S) is decreased to 3.2611 kj/kgK, and the Methanol is changed to the vapor state (e.g., 100 percent vapor) as indicated in state "C". The Methanol may then pass through the condenser 9, which decreases the temperature (T) of the Methanol to 25° Celsius, the enthalpy (H) of the Methanol to −105.5 kj/kg, and the entropy(S) of the Methanol to −0.332 kj/kgK (see step "D"). The Methanol may then pass through the compressor 11 to elevate the pressure (P) of the Methanol to 50 psi when returning to state "A" to repeat the cycle. The following table compares the amount of work and electricity that can be produced with Methanol and water as working fluids under similar conditions (i.e., the thermal energy source is exhaust flue gas of a drilling rig diesel engine).

TABLE 4

Methanol vs. Water

| Fluid | Work (kj/kg) | Electricity (kwh/kg) | Electricity (mw/kg/year) |
|---|---|---|---|
| Water ($H_2O$) | 81.9 | 0.02275 | 0.1993 |
| Methanol ($CH_3OH$) | 1,226.2327 | 0.34 | 3.0 |

The above comparison of Methanol and water as working fluids shows that Methanol can produce over 15 times more electricity per year than water, and is thus a far a better choice than water for utilization in the thermal energy systems discussed herein.

Figure 7A:
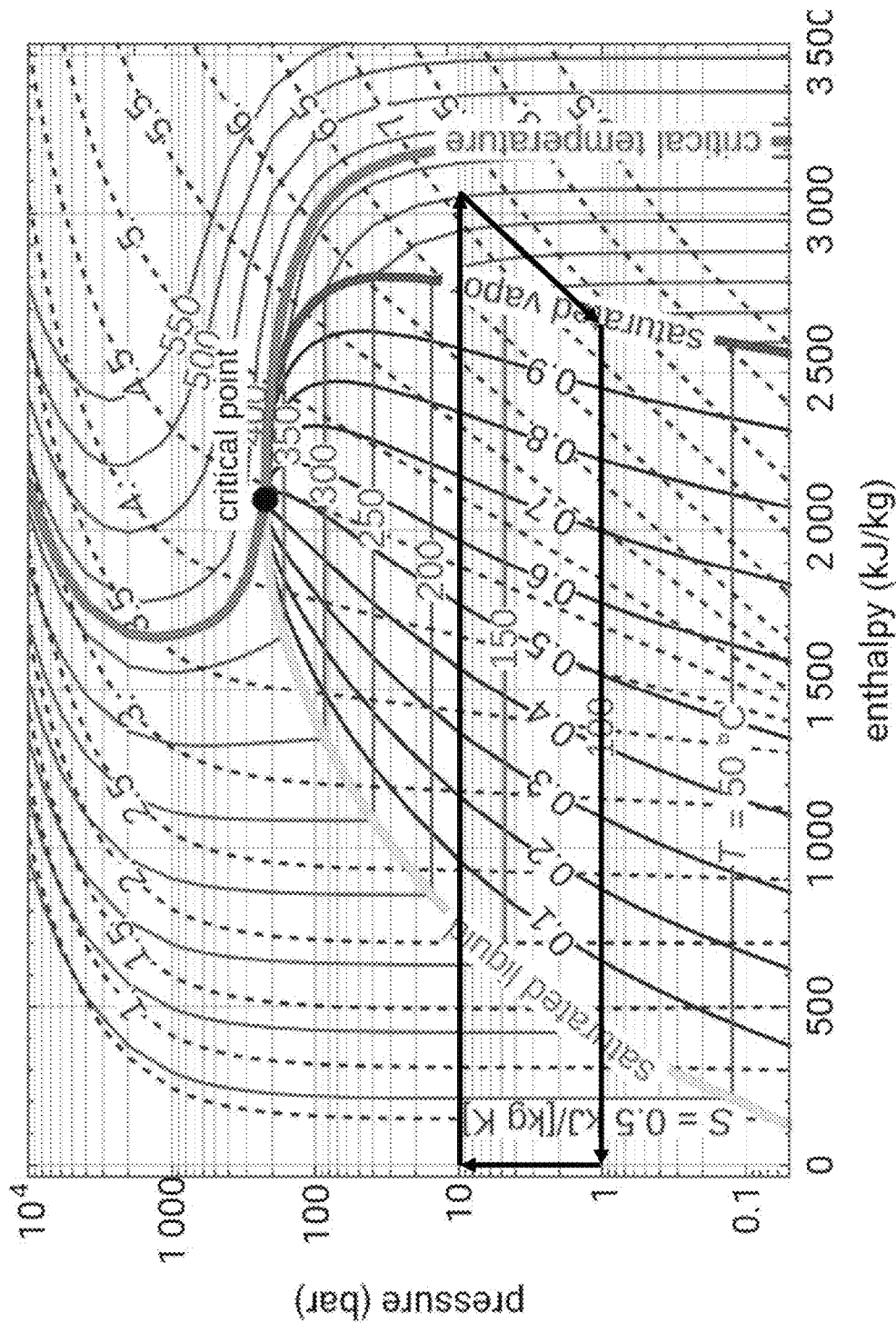
FIG. 7A illustrates a graph of a Rankine Cycle for water showing thermodynamic properties of water where the thermal energy source is a flare.

FIG. 7A illustrates a graph of a Rankine Cycle showing thermodynamic properties of water as a working fluid where the thermal energy source is a flare. The graph shows the critical point for water at the intersection of its saturated liquid curve, saturated vapor curve, and critical temperature curve, with respect to pressure (y-axis) and enthalpy (x-axis).

FIG. 7B illustrates an example of a Rankine Cycle that is implemented by a thermal energy system in which water is used as the working fluid, and the thermal energy source is a flare, such as a flare resulting from the burning process of natural gas associated with oil extraction. In general, temperatures of 700-1400° C. (1292-2552° F.) are produced from a flare. In this embodiment, the water enters the heat exchanger 2 relatively quickly to absorb heat. Thus, the temperature of the water will rise to just 300° C. In the Rankine Cycle, the thermodynamic process flows as follows: Heat Exchanger (Isobaric) to Turbine (Adiabatic) to Condenser (Isobaric) to Compressor (Adiabatic). At state "A" in FIG. 7B, the water is under a pressure (P) of 150 psi, has a temperature (T) of 25° Celsius, has an enthalpy (H) of 105.88 kj/kg, has an entropy(S) of 0.3669 kj/kgK, and is in a 100 percent liquid state. In the heat exchanger 2, the temperature (T) is raised to 300° Celsius by the heat (Q) of 2,942.12 kj/kg from the flare, the enthalpy (H) is raised to 3,048 kj/kg, the entropy(S) is raised to 7.0612 kj/kgK, and the state of the water is changed to gas/vapor state (e.g., 100 percent steam). The heated water enters a turbine in this state (state "B") to drive the turbine 5 and perform work at 372.4 kj/kg. The work may drive an electricity generator 6 to generate electricity 7 via electromagnetic induction to produce electricity 7 in the amount of 0.1034 kwh/kg, i.e., 0.906 mw/kg per year. After passing through the turbine 5, the pressure (P) of the water is decreased to 14.7 psi, the temperature (T) is decreased to 100° Celsius, the enthalpy (H) is decreased to 2,675.6 kj/kg, the entropy(S) is raised to 7.3544 kj/kgK, and the water is maintained in the gas/vapor state (e.g., 100 percent steam) as indicated in state "C". The water may then pass through a condenser 9, which decreases the temperature (T) of the water to 25° Celsius, the enthalpy (H) of the water to 104.92 kj/kg, and the entropy(S) of the water to 0.3672 kj/kgK (see step "D"). The water may then pass through a compressor 11 to elevate the pressure (P) of the water to 150 psi and may change to the state of the water to a complete liquid state, when returning to state "A" to repeat the cycle. Accordingly, water as the working fluid with a flare as the thermal energy produces work at 372.4 kj/kg, which may generate 0.1034 kwh/kg of electricity, i.e., 0.906 mw/kg of electricity per year.

The foregoing geothermal systems for generating electricity may be utilized in processes of generating electricity. These processes may include selecting a predetermined primary fluid 1 that comprises: a latent heat greater than a latent heat of water at a phase change from liquid to gas; and a specific heat capacity less than a specific heat capacity of water in a liquid phase and in a gas phase, as discussed herein; selecting a predetermined secondary working fluid that comprises: a latent heat less than a latent heat of water at a phase change from liquid to gas; and a specific heat capacity less than a specific heat capacity of water in a liquid phase and in a gas phase, as discussed herein. The processes may include heating the predetermined primary fluid 1 by absorbing thermal energy from the geothermal energy source to produce a heated primary fluid 1 as discussed herein; exchanging the thermal energy of the heated primary fluid 1 with the predetermined secondary working fluid 3 in a heat exchanger 2 to elevate a kinetic energy of the predetermined secondary working fluid 3 as discussed herein; driving a turbine 5 via the kinetic energy of the predetermined secondary working fluid 3 as discussed herein; and driving an electricity generator 6 by the turbine 5 to generate electricity 7 as discussed herein. In the processes, the predetermined secondary working fluid 3 may be in a supercritical state when the kinetic energy drives the turbine 5 as discussed herein. In the processes, a boiling point of the predetermined primary fluid 1 may be lower than a temperature of the geothermal energy source, and the predetermined secondary working fluid 3 may have a lower boiling point than a temperature of the predetermined primary fluid 1 at the heat exchanger 2, as discussed herein.

The processes may further include: assigning values to physical and chemical properties of at least one of the predetermined primary fluid 1 and the predetermined secondary working fluid 3, as discussed herein, and utilizing the at least one of the predetermined primary 1 fluid and the predetermined secondary working fluid 3 in the processes based on a sum total of the values. As discussed herein, the values assigned to the boiling point, the specific heat capacity, and the latent energy may have greater weight than the values assigned to the phase status, the specific enthalpy, the specific entropy, the supercriticality, the flash point, the specific heat storage capacity, and the thermal conductivity. The values assigned to the phase status, the specific enthalpy, the specific entropy, the supercriticality may have greater weight than the values assigned to the flash point, the specific heat storage capacity, and the thermal conductivity, as discussed herein. The values assigned to the flash point and the specific heat storage capacity may have greater weight than the value assigned to the thermal conductivity, as discussed herein.

The processes may further include: assigning values to Health, Safety and Environmental (HSE) properties of at least one of the predetermined primary fluid 1 and the predetermined secondary working fluid 3, and utilizing the at least one of the predetermined primary fluid 1 and the predetermined secondary working fluid 3 in the system based on a sum total of the values, as discussed herein. The value assigned to the flammability may have a greater weight than the values assigned to the harmfulness to humans, the environmental friendliness, the corrosiveness, and the erosiveness, as discussed herein. The values assigned to the harmfulness to humans and the environmental friendliness may have a greater weight than the values assigned to the corrosiveness and the erosiveness, as discussed herein. The processes may also include: assigning a value to a monetary cost of at least one of the predetermined primary fluid 1 and the predetermined secondary working fluid 3 as discussed herein, and utilizing the at least one of the predetermined primary fluid 1 and the predetermined secondary working fluid 3 in the processes based at least in part on the value as discussed herein.

In the processes, the predetermined primary fluid 1 may be comprised of one or more materials that provide the predetermined primary fluid 1 with a latent heat that is at least greater than total heat loss from the geothermal energy source to maintain at least a boiling temperature of the predetermined primary fluid 1 at the heat exchanger 2.

The foregoing geothermal systems for generating electricity may be utilized in processes of generating electricity that include selecting a predetermined working fluid 1 that comprises: a latent heat less than a latent heat of water at a phase change from liquid to gas; and a specific heat capacity less than a specific heat capacity of water in a liquid phase and in a gas phase, as discussed herein. The processes may include heating the predetermined working fluid 1 by absorbing thermal energy from the geothermal energy source to elevate a kinetic energy of the predetermined working fluid 1 as discussed herein; driving a turbine 5 via the kinetic energy of the predetermined working fluid 1 as discussed herein; and driving an electricity generator 6 by the turbine 5 to generate electricity 7 as discussed herein. In the processes, the predetermined working fluid 1 may be in a supercritical state when the kinetic energy drives the turbine 5 as discussed herein. And, the boiling point of the predetermined working fluid 1 may be lower than a temperature of the geothermal energy source as discussed herein.

The foregoing thermal systems for generating electricity may be utilized in processes of generating electricity that include heating a predetermined working fluid 1 by absorbing thermal energy from a thermal energy source to elevate a kinetic energy of the predetermined working fluid 1 as discussed herein; performing work via the kinetic energy to drive a shaft of a mechanical device 5 as discussed herein; and driving a generator 6 via rotation of the shaft of the mechanical device 5 to generate electricity by electromagnetic induction as discussed herein, wherein the thermal energy source is located at one of: on a surface of the earth, above the surface, and below the surface at a depth having a temperature insufficient to boil water. In the processes, the thermal energy source may be one of a flare, exhaust flue gas, a reactor, a refinery, a hot water tank, an engine, natural hot springs, volcanoes, and desert sand. In addition, the predetermined working fluid 1 is in a supercritical state when the kinetic energy drives the shaft of mechanical device 5.

Further, the foregoing thermal systems for generating electricity may be utilized in processes of generating electricity that include heating a working fluid 1 of a thermal energy source so that the working fluid 1 has a sufficient amount of kinetic energy to perform work as discussed herein; performing the work via the kinetic energy to drive a shaft of a mechanical device 5 as discussed herein; and driving a generator 6 via rotation of the shaft of the mechanical device 5 to generate electricity by electromagnetic induction as discussed herein, wherein the thermal energy source is located at one of: on a surface of the earth, above the surface, and below the surface at a depth having a temperature insufficient to boil water. In the processes, the working fluid 1 may be one of exhaust flue gas, a natural hot spring, and gas from a volcano. In addition, the working fluid 1 may be in a supercritical state when the kinetic energy drives the shaft of mechanical device 5.

It is within the scope of the present disclosure that the processes of generating electricity may implement any combinations of the components of the systems as discussed herein, and include operation of the systems discussed herein and any combinations of the components of the systems as discussed herein.

The thermal energy systems and processes discussed herein utilize predetermined fluids that are selected based on properties which minimize heat loss of the fluids and maximize the absorption of thermal energy. Minimizing heat loss and maximizing the absorption of thermal energy increases the kinetic energy of the working fluids that are used to drive the turbine 5 or other mechanical device, so that the turbine 5 other mechanical device is driven with a greater force and/or velocity. Driving the turbine 5 other mechanical device with more force and/or velocity turns the shaft of the turbine 5 or other mechanical device faster, which creates more electromagnetic induction in the electricity generator 6 at a faster rate. As a result, the electricity generator 6 generates more electricity 7 at a faster rate. The thermal energy systems and processes discussed herein are thus more efficient at generating electricity than conventional thermal energy systems and processes. The primary fluids 1 and the secondary working fluids 3 in the thermal energy systems and processes discussed herein are predetermined based on an analytical, value assigned process for selecting suitable fluids based on fluid properties/characteristics and environmental factors.

Such predetermined primary fluids 1 and secondary working fluids 3 enable the thermal energy systems and processes for generating electricity discussed herein to utilize thermal energy from not only geothermal and solar energy sources, but nearly any thermal source—such as a gas flare resulting from the burning process of natural gas associated with oil extraction; exhaust flue gas; exhaust emitted from an engine; heat conducted from oil and gas pipelines/flow lines; combustion occurring in an engine or a gas turbine; a reactor, such as a nuclear reactor and/or gas/vapor emitted from the cooling tower of a nuclear reactor; a refinery and/or gas/vapor emitted from the refinery; and commercial and residential heaters, such as water heaters, furnaces, ovens and stoves; natural hot springs, volcanoes, and desert sand—to produce work to effectively and efficiently generate electricity 7 via the electricity generator 6. By proper selection or design of a working fluid (e.g., other than water) to suit the specificity type of thermal energy source, thermodynamic conditions of cycle, and/or environmental aspects, sufficient thermal energy can be absorbed from any of these thermal energy sources and utilized to effectively and efficiently perform the work that is required to generate electricity. As such, the thermal energy systems and processes discussed herein are not dependent on only thermal energy sources in deep underground wells, and can provide viable alternatives to the geothermal energy sources that are found only in deep geothermal wells.

The thermal energy systems and processes discussed herein thus provide improvements over known systems and processes.

It should be understood that the foregoing description provides embodiments of the present invention which can be varied and combined without departing from the spirit of this disclosure. Although several embodiments have been illustrated in the accompanying drawings and describe in the foregoing specification, it will be understood by those of skill in the art that additional embodiments, modifications and alterations may be constructed from the principles disclosed herein. Those skilled in the art should, in light of the present disclosure, appreciate that many changes can be made in the specific embodiments which are disclosed and still obtain a like or similar result without departing from the concept, spirit and scope of the present disclosure.

What is claimed is:

1. A thermal system for generating power, comprising:
a mechanical device comprising a shaft;
a predetermined working fluid that absorbs thermal energy from a thermal energy source to become a heated working fluid having a sufficient amount of kinetic energy to perform work that turns the shaft of the mechanical device; and
a generator that is driven via rotation of the shaft of the mechanical device to generate electricity by electromagnetic induction, wherein;
the thermal energy source is located at one of: on a surface of the earth, above the surface, and below the surface; and
the predetermined working fluid has a total value comprising a highest sum total of:
a first sum total of values assigned to physical and chemical properties of the predetermined working fluid, the physical and chemical properties including at least one of: boiling point, specific heat capacity, latent energy, phase status, specific enthalpy, specific entropy, supercriticality, flash point, specific heat storage capacity, and thermal conductivity;

a second sum total of values assigned to Health, Safety and Environmental (HSE) properties of the predetermined working fluid, the HSE properties including at least one of: flammability, harmfulness to humans, environmental friendliness, corrosiveness, and erosiveness; and a third value assigned to a monetary cost of the predetermined working fluid.

2. The thermal system according to claim 1, wherein the thermal energy source is one of a flare, exhaust flue gas, a reactor, a refinery, a hot water tank, an engine, natural hot springs, volcanoes, and desert sand.

3. The thermal system according to claim 1, wherein the predetermined working fluid is in a supercritical state when the kinetic energy drives the shaft of mechanical device.

4. A thermal process for generating power, comprising:
selecting a predetermined working fluid comprising:
assigning first values to physical and chemical properties of the predetermined working fluid, the physical and chemical properties including at least one of: boiling point, specific heat capacity, latent energy, phase status, specific enthalpy, specific entropy, supercriticality, flash point, specific heat storage capacity, and thermal conductivity:
assigning second values to Health, Safety and Environmental (HSE) properties of the predetermined working fluid, the HSE properties including at least one of: flammability, harmfulness to humans, environmental friendliness corrosiveness, and erosiveness;
assigning a third value to a monetary cost of the predetermined working fluid; and
utilizing the predetermined working fluid in the process based on a highest sum total of: a sum of the first values; a sum of the second values; and the third value;
heating the predetermined working fluid by absorbing thermal energy from a thermal energy source to elevate a kinetic energy of the predetermined working fluid;
performing work via the kinetic energy to drive a shaft of a mechanical device; and
driving a generator via rotation of the shaft of the mechanical device to generate electricity by electromagnetic induction, wherein
the thermal energy source is located at one of: on a surface of the earth, above the surface, and below the surface.

5. The process according to claim 4, wherein the thermal energy source is one of a flare, exhaust flue gas, a reactor, a refinery, a hot water tank, an engine, natural hot springs, volcanoes, and desert sand.

6. The process according to claim 4, wherein the predetermined working fluid is in a supercritical state when the kinetic energy drives the shaft of mechanical device.

7. The thermal system according to claim 1, wherein:
the thermal energy source comprises a heated fluid; and
the predetermined working fluid absorbs the thermal energy from the heated fluid to become the heated working fluid.

8. The system according to claim 7, wherein the heated fluid is one of exhaust flue gas, a natural hot spring, and gas from a volcano.

9. The process according to claim 4, wherein:
heating the predetermined working fluid comprises absorbing the thermal energy from a heated fluid of a thermal energy source.

10. The process according to claim 9, wherein the heated fluid is one of exhaust flue gas, a natural hot spring, and gas from a volcano.

11. The thermal system according to claim 1, wherein:
the values assigned to the boiling point, the specific heat capacity, and the latent energy have greater weight than the values assigned to the phase status, the specific enthalpy, the specific entropy, the supercriticality, the flash point, the specific heat storage capacity, and the thermal conductivity;
the values assigned to the phase status, the specific enthalpy, the specific entropy, the supercriticality have greater weight than the values assigned to the flash point, the specific heat storage capacity, and the thermal conductivity;
the values assigned to the flash point and the specific heat storage capacity have greater weight than the value assigned to the thermal conductivity;
the value assigned to the flammability has a greater weight than the values assigned to the harmfulness to humans, the environmental friendliness, the corrosiveness, and the erosiveness; and
the values assigned to the harmfulness to humans and the environmental friendliness have a greater weight than the values assigned to the corrosiveness and the erosiveness.

12. The process according to claim 4, wherein:
the first values assigned to the boiling point, the specific heat capacity, and the latent energy have greater weight than the first values assigned to the phase status, the specific enthalpy, the specific entropy, the supercriticality, the flash point, the specific heat storage capacity, and the thermal conductivity;
the first values assigned to the phase status, the specific enthalpy, the specific entropy, the supercriticality have greater weight than the first values assigned to the flash point, the specific heat storage capacity, and the thermal conductivity;
the first values assigned to the flash point and the specific heat storage capacity have greater weight than the first value assigned to the thermal conductivity;
the second value assigned to the flammability has a greater weight than the second values assigned to the harmfulness to humans, the environmental friendliness, the corrosiveness, and the erosiveness; and
the second values assigned to the harmfulness to humans and the environmental friendliness have a greater weight than the second values assigned to the corrosiveness and the erosiveness.

* * * * *